(12) United States Patent
Lovas

(10) Patent No.: US 8,860,240 B2
(45) Date of Patent: Oct. 14, 2014

(54) WIND WING ELECTRICAL GENERATOR

(71) Applicant: Andrew Lovas, San Francisco, CA (US)

(72) Inventor: Andrew Lovas, San Francisco, CA (US)

( * ) Notice: Subject to any disclaimer, the term of this patent is extended or adjusted under 35 U.S.C. 154(b) by 0 days.

(21) Appl. No.: 14/175,444

(22) Filed: Feb. 7, 2014

(65) Prior Publication Data
US 2014/0169945 A1     Jun. 19, 2014

Related U.S. Application Data

(62) Division of application No. 13/716,465, filed on Dec. 17, 2012, now Pat. No. 8,734,084.

(51) Int. Cl.
*F03D 9/00* (2006.01)

(52) U.S. Cl.
USPC .............................................. 290/55; 290/44

(58) Field of Classification Search
USPC ........................... 290/43, 44, 54, 55; 415/4.2
See application file for complete search history.

(56) References Cited

U.S. PATENT DOCUMENTS

| | | | | |
|---|---|---|---|---|
| 171,962 | A * | 1/1876 | Stevens et al. | 415/4.1 |
| 4,174,923 | A * | 11/1979 | Williamson | 415/211.1 |
| 4,288,200 | A * | 9/1981 | O'Hare | 415/4.4 |
| 7,605,491 | B1 * | 10/2009 | Chung | 290/55 |
| 8,026,620 | B2 * | 9/2011 | Hobdy | 290/42 |
| 8,167,532 | B2 * | 5/2012 | Hsu et al. | 415/4.2 |

* cited by examiner

*Primary Examiner* — Nicholas Ponomarenko

(57) ABSTRACT

The Wind Wing Electric Generator is a apparatus for inexpensively converting oscillating rotating mechanical energy into electrical energy.

1 Claim, 31 Drawing Sheets

(a.)

(b.)

(a.)

(b.)

(c.)

WIND WING ELECTRICAL GENERATOR

DIVISION

This application is a division of application Ser. No. 13/716,465 originally filled Dec. 17, 2012.

CROSS-REFERENCE TO RELATED APPLICATIONS

1. Provisional Patent Application No. 61/598,023
Filing Date: Feb. 13, 2012
Title of Invention: Wind Wing
Relationship to current application: Earlier version of this and the divided invention
2. Provisional Patent Application No. 61/509,535
Filing Date: Jul. 19, 2011
Title of Invention: Wind Tunnel Wing 10
Relationship to current application: Earlier version of this and the divided invention
3. Provisional Patent Application No. 61/401,146
Filing Date: Aug. 9, 2010
Title of Invention: Wind Tunnel Wing
Relationship to current application: Earlier version of this and the divided invention
4. Provisional Patent Application No. 61/343,671
Filing Date: May 3, 2010
Title of Invention: Wind tunnel wing
Relationship to current application: Earlier version of this and the divided invention
5. Provisional Patent Application No. 61/273,327
Filing Date: Aug. 3, 2009
Title of Invention: Wind tunnel wing
Relationship to current application: Earlier version of this and the divided invention

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The Wind Wing Electric Generator was developed as a means of converting mechanical energy into electrical energy for an invention named the Wind Wing (application Ser. No. 13/716,465 filed Dec. 17, 2012). Upon advice from the USPTO the application was divided Oct. 10, 2013. Three of its original six claims which were withdrawn from it and, following editing, have been traversed to this application. Beyond this role, the Wind Wing Electric Generator has broader application than simply as a mechanical energy to electrical energy conversion system for a Wind Wing.

The Wind Wing was conceived as means of converting wind energy into electrical energy with minimal displacement of mass.

It was belief of the inventor that a vertical unarticulated airfoil, capable of rotating to a limited but significant degree around a vertical shaft, could be engineered to oscillate in the wind. And that following Faraday's Law of Induction, a coil attached to the airfoil's trailing edge, nearby a pole of a stationary magnet, would have a voltage induced within it. That wind energy might be converted into electrical energy with such minimal movement of mass suggested it might produce a simpler, more reliable, safer, and less expensive alternative to existing methods of converting wind energy into electrical energy.

A small wind generation machine was constructed using a variable speed DC (automobile radiator) fan, and a range of unarticulated airfoils were fabricated and tested. None was able to achieve oscillation.

The problem is that, as an unarticulated airfoil rotates, lift decreases in the direction its tail rotates; while at the same time it increases in the reverse direction. With sufficient airflow, most unarticulated airfoils will flutter or vibrate. But they will not oscillate across any significant angular range.

This testing did reveal however, that when an unarticulated streamlined symmetrical airfoil was mounted vertically inside an open-ended box structure through which passed a 5 MPH+ (2.235 M/S+) airflow, the forces keeping its chord parallel to the airflow (named the "Restoring Forces") were much stronger than anticipated. This led to three principal concurrent research and development efforts.

The first was to survey and exercise of a range of web accessible computational fluid dynamics programs (NASA FoilSim, JavaFoil, etc.) to determine what kinds of airfoils in what configurations would yield the very low static pressure that appeared responsible for these Restoring Forces. After literally hundreds of test runs, it became apparent that by carefully selecting, sizing and positioning three vertical streamlined symmetrical unarticulated airfoils, the outside two each having a cross section close to NACA 0020, and the middle one having a cross section close to NACA 0040, air velocity in sections of the channels between them would be increased, and static pressures decreased, to shocking degrees.

The second was the development of a simple scheme for taking advantage of these very low pressure sections of the channels to convert wind energy into mechanical energy: Keeping the apparatus face to the wind, segmenting the cross section of the middle streamlined symmetrical unarticulated airfoil (the one having a cross section close to NACA 0040) into the cross section of a Forward Nacelle, the cross section of an Aft Nacelle, and copying the remaining cross section, rotating the copy around the axis of a shaft approximately 53 degrees, and uniting the copy and the original, creating the cross section of a new airfoil which would, in the presence of sufficient airflow, oscillate over a range of almost 60 degrees. This new airfoil was named the "Oscillating Wing."

Testing of models incorporating these developments on the top of the inventor's car revealed a number of advantages over turbines. The first is the Wind Wing's inherent structural stability. Some of this is due to the structure itself, four vertical members (Two outside walls [a Starboard Wall and a Port Wall], a Forward Nacelle and an Aft Nacelle) all anchored at each end in a Roof and Floor (the Oscillating Wing pivoting in bearings in the Roof and the Floor). Part of it is due to the Wind Wing's use of the monocoque construction technique— introduced by the French in their WW I airplanes and employed by the airplane building industry ever since. At one point an early Wind Wing model, constructed of some wooden dowels, foamboard, glue and paper, literally blew off from the top of the inventor's car and bounced along the abandoned runway which the car was being driven up and down. It was recovered without damage. The same model was then able to withstand, and function in 50+MPH (22.352+m/s) of apparent wind—meaning it will likely not require the furling capability demanded by all but the smallest of turbines. Most rewardingly, videos of its performance showed a remarkable pattern of oscillations, increasing in frequency with increasing apparent wind speed, but asymptoting at approximately 10 CPS in approximately 35 MPH (15.646 m/s) of apparent wind. Together, they indicate good size (roughly 10 foot [3 Meter] high) Wing Wings could be deployed in highly urban environments without most of the significant dangers to humans and flying creatures (to say nothing of unsightly appearance) associated with turbines of the same or larger size.

The third principal research and development effort was toward inventing what became the Wind Wing Electric Generator. The originally conceived concept had two elements: a coil wrapped around the Oscillating Wing (hereafter, the "Coil"), and a magnet positioned aft of, and nearby it. Both of these elements went through a series of improvements, often on the basis of observations concerning the states of related arts, and sometimes using techniques that had been for the most part abandoned. The result is a machine which relatively efficiently converts oscillating rotating mechanical energy of a limited range (roughly 60 degrees) into electrical energy. And which more importantly, appears can be fabricated at very low cost by local craftspeople using mostly locally available materials in almost any community anywhere in the world.

The first step in advancing the Coil involved discovering a geometry of wrapping it which would allow positioning of magnets both fore and aft of its aft side. This theoretically should allow flux density across the aft side of the Coil to be doubled from what would be the case were it limited to the same magnet(s) on only one side—thereby doubling the voltage induced in the Coil as its aft side oscillates between them. To enable this, the Coil has to be wrapped in a unique manner with alternative wrappings clearing each side of whatever is used to support the magnet(s) forward of the aft side of the Coil when the Oscillating Wing is rotated through its entire 60 degree range—as well as keeping the Coil's moment as low as practical so as to minimize the effect on the Oscillating Wing's ability to oscillate. The final solution appears unique and constitutes one of the claims of this application.

As it became increasingly apparent that in many of the poorer communities of the in the world, capable Wind Wings (with sufficient local wind [estimated to be available at any time in 30% of the inhabited world] should be able to illuminate two small rooms [using LEDs], power a smart phone, etc.) might fabricated by local craftsman using locally available materials, focus was directed on the cost of Coil wire, particularly with the most obvious material, copper, currently experiencing historic cost increases.

Over the next few months it was recognized that aluminum is likely to prove a better alternative: Because it is almost freely available in discarded soft drink cans, has a relatively low melting point, relatively high conductivity, is relatively light in weight, and properly annealed, becomes relatively malleable. Furthermore, the methodology of drawing wire has been in existence since the Middle Ages. All that appears would be to fabricated it are (not inconsiderable) know-how, blacksmithing capabilities, and of course, source materials such as aluminum cans and a lubricant (to facilitate wire drawing). Final preparation would involve coating the wire with a locally concocted resin to change it into magnet wire.

So that it appears that with adequate instruction, based in significant part upon study of local situations, it should be possible to for local craftsmen to draw sufficient wire for a small to medium size (3-4 feet [0.9 to 1.2 meters] high) Wind Wing with approximately one or two man-days of labor per. In poorer communities of the world, this cost might not be much more than $7. Finally, automated wire drawing machinery is available at affordable cost to NGO and governments wishing to support regional efforts.

Appearing even more inspired was the series of discoveries that drove the evolution of the assembly that positions magnets fore and aft of the aft side of the coil, here named the Dipole Permanent Magnet Assembly (abbreviated as the "PDMA"). It is a remarkable unit.

A DPMA is built up from two identical L-shaped iron bars, one rotated 180 degrees from the other, so that when brought together with the ends of the shorter sections of the Ls positioned flush against the insides of the longer sides of the other bars, they form a rectangle. Among the remarkable things discovered about this rectangle is that by hammering the length of the shorter side of these L-shaped bars, the longer sides can be brought closer together in $1/10,000$-inch (0.00025-meter) increments. This means that using them to house magnets fore and aft of the aft side the Coil, the gap between these magnets (through which the aft side of the Coil oscillates) can be adjusted to be no wider than absolutely necessary to allow the aft side of the coil to oscillate through it. This precision rivals machine tooling toward the same objective.

Cut into, or punched into (by blacksmithing) into the longer sides of these L-shaped bars can be slots through which multiple individual magnets, with their poles all aligned in the same fore and aft direction, can be wedged after being inserted from the bars' outsides. Because of this housing capability these L-shaped bars have been named the "Forward Magnet Array Holder" and the "Aft Magnet Array Holder."

It can be appreciated that each is no more complicated (although somewhat larger) than a horseshoe. They are thus capable of being fabricated by a reasonably capable blacksmith with not much more than ½ hour of effort each.

Two other L-shaped bars, named "Backing Plates" can then fit over the outsides of the Forward Magnet Array Holder and the Aft Magnet Array Holder and, being secured with something as simple as twine, insure that the magnets remain in their slots (but allowing them to be conveniently replaced when justified)—and most remarkably provide a least-resistance path for flux between the outside poles of the magnets housed in the Forward Magnet Array Holder and those housed the Aft Magnet Array Holder—this path going over and under the aft side of the Coil.

This least-resistance (iron) path essentially eliminates what would otherwise be a (air) path (from the forward pole (s) of the forward array of magnets to the aft pole(s) of the aft array of magnets) through the aft side of the Coil. It thus provides the critical element in using magnets on both sides of the aft side of the Coil.

The horizontal outline of each magnet is logically an isosceles trapezoid (allowing them to be wedged into the slots in the Forward Magnet Array Holder and those the Aft Magnet Array Holder, where they can be held in place by the Backing Plates). When these magnets are stacked vertically and congruently, and held together, they form what are known as compound magnets.

Where a compound magnet gains its advantage over a simple bar magnet of equal total size is in their individual magnets being much more conducive whatever techniques is used to magnetize them by (being shallower) having their about-to-be-magnetized domains closer to its surfaces and thus more susceptible to the magnetizing force.

Through the late 1800s, compound magnets were the most recognized means of creating strong magnetic fields. They then fell behind improving metallurgy and stronger electromagnetizing. Here again, beyond communities creating their own magnets and compound magnets, there are opportunities for organizations wishing to sponsor regional efforts by providing at low cost relatively powerful magnets along with Coil wire.

The total cost for both (wire and PMDA), sufficient to construct a Wind Wing Electric Generator for small to medium size (3-4 feet [0.9 to 1.2 meters] high) Wind Wing should be not much more than $14.

As it became increasingly apparent that most of a small to medium size Wind Wing could be fabricated by local craftsmen using locally available materials at low cost in almost any poor community anywhere in the world, consideration was directed toward making the design freely available to these communities building them for their own use.

The potential appeared and still appears enormous. Somewhere between 20% and 30% of the world lives without economic access to electricity. And at least 25% of them live in areas where there is sufficient wind that, with progressing LED and battery technologies, it appears possible to replace much of their use of fire (including kerosene lamps) for household illumination after the sun has set, and even to power internet access smart phone.

This potential is magnified when one considers virtually every other really significant advancement in converting wind energy into mechanical energy and mechanical energy into electrical energy occurred following initial discovery of the technology, when engineers took over from the inventor. It seems not unreasonable to anticipate that this will occur with the Wind Wing and the Wind Wing Electric Generator.

To accelerate both developments, the inventor decided to surrender all rights to poorer communities building such machines for their own use via the US Government—who could then rightfully claim further development from these machines current status, as well as handle distribution of enabling information to these communities. Aside from the humanity of such an effort, it would further its intent to affect climate change, to say nothing of enhancing its image. In this direction, correspondence was initiated with the National Renewable Energy Laboratory ("NREL"), including sending them a video of the testing conducted on the inventor's car and a 43-page write-up prepared by the inventor to insure survivorability of what had been recognized by him up through September 2012. These items remain available to responsible parties.

While this correspondence remained encouraging throughout, it eventually became apparent that, in the words of the Director of the NREL, 'it was not within its authority to so direct its resources." At that point it appeared prudent to apply for a US patent. And an application was filed Dec. 17, 2012 (application Ser. No. 13/716,465).

One of the items raised by the NREL Senior Engineer with whom most of the correspondence was conducted, and later in conversation by the Director, was their opinion that the next item in the inventor's agenda might be "testing with a load on the Oscillating Wing."

Until then, and after the inventor had not seen this as a principal issue. Because, while it obvious there is some load that will delay and otherwise inhibit oscillation, the Oscillating Wing is remarkably scalable in terms of being able to capture more wind energy, converting it to more mechanical energy thus increasing its ability to function with an additional limited load on it.

Like on an airplane, (or on a turbine) where lift can be increased by extending the wings (or on a turbine, the blades), lift in a Wind Wing—and thus its ability to convert wind energy into mechanical energy—can be increased by simply extending the (vertical) length of the Oscillating Wing (and with it of course, the vertical elements that connect its Roof and Floor: its Forward Nacelle, Aft Nacelle, Starboard Wall and Port Wall).

However unlike an airplane wings (or turbine blades) which are anchored at only one end (at the fuselage, or on a turbine, at the turbine axis) the Oscillating Wing is anchored at both ends (at the Roof and at the Floor). Structurally, this makes it 4 times more resistant to bending by pressure along its length (such as exerted by the local apparent wind). Beyond this, an Oscillating Wings maintains the same cross section across their entire length. So that the machine is extraordinarily scalable. And problems resulting from an debilitating loading of an Oscillating Wing appear among the most easily to remedy.

Recent studies of another machines attempting to improve upon turbines have been encouraging. One in particular, focused on an articulated Oscillating Wing apparatus (in contrast to the Oscillating Wing in the Wind Wing being unarticulated), the Wind Fin, titled 'Wind Energy Extraction Using a Wind Fin' by Professors Mark Costello and Vasudevan Manivannan of Georgia Tech, capsulizes, in its Introduction, the Wind Wing's power potential: "While the geometry and operation of the wind fin is far different from horizontal axis wind turbines, the power output is within the same range." The significance of this is that relative to horizontal axis wind turbines the Wind Wing, (including its Wind Wing Electric Generator) should cost 60-70% less, avoid a turbine's danger to humans and other creatures, prove more reliable, function over a broader range of environments and be seen as more attractive in urban settings With the granting of patent protection, the inventor plans to make the Wind Wing and Wind Wing Electric Generator public. With the attention directed toward the Wind Fin and another innovative concept, the Windbelt, and with its potential to provide electricity to communities unable to afford it; allowing them longer days, expanding educational tools and reducing human toil, poverty, deforestation, pollution and global warming, it appears not unreasonable that it will attract sufficient improvement efforts to do real good in the world.

Finally, it appears that the Wind Wing Electric Generator is likely to find application other than in Wind Wings. There appear to be literally thousands of situations where oscillating mechanical energy is being wasted because of lack of an economical and reliable means of converting it into electrical energy. The Wind Wing Electric Generator appears capable of filling part of this void.

BRIEF SUMMARY OF THE INVENTION

The Wind Wing Electric Generator was developed to convert oscillating rotational mechanical energy into electrical energy as an element of the Wind Wing. The Wind Wing is a simple and inexpensive apparatus for converting wind energy into electrical energy.

There are two representative models. Both employ the same mechanism for converting wind energy into mechanical energy, an Oscillating vertical wing. But they differ in cost, how they can be fabricated, the communities they can serve, and the means by which they can covert mechanical energy into electrical energy.

The first model, named here the "$20 Model" appears capable of being fabricated in almost any community anywhere in the world by local craftsmen using locally available inexpensive materials. It is intended to provide electricity to communities unable to afford it; allowing them longer days, expanding educational tools and reducing human toil, poverty, deforestation, pollution and global warming. It does this by using the mechanical energy captured from the wind by its Oscillating wing to power a new type and unusually efficient (electrical) generator invented for the purpose.

The second model, named here the "$500 & up Model," taking advantage of better materials, and fabrication capabilities, can elsewhere substantially improve the economic competitiveness of electricity from the wind against that from non-renewable sources such as coal, oil, natural gas and nuclear; reducing the cost of electricity as well as these sources' contributions to pollution, global warming, demands for production, supporting transportation and transmission systems, related accidents and blight. It also uses the mechanical energy captured from the wind by its Oscillating wing, but may use established mechanical energy to electrical energy components, in lieu of the aforementioned new type of (electrical) generator.

Against state of the art wind turbines of similar size and in similar wind conditions, the $500 and up Model should provide:
- a. Lower cost per watt
- b. Higher reliability
- c. Less obtrusiveness, and indeed attractiveness
- d. Less noise
- e. Ability to continue performing in higher speed winds
- f. Greater utilization of the available cross section of wind
- g. Absence of harm to birds and other flying creatures
- h. Less costly maintenance
- i. Greater safety

BRIEF DESCRIPTION OF THE SEVERAL VIEWS OF THE DRAWINGS

The attached DRAWINGS show the preferred and other embodiments of the Wind Wing apparatus, its components, certain design and construction aids and methods, and the manners in which they function.

Lower numbered drawings will sometimes, in the interest of communicating the same function at different levels of depth, lack details that appear in higher numbered drawings. Where there might appear any conflict, the higher numbered drawing should prevail.

The DRAWINGS cover the two Models of the Wind Wing, the $20 Model and the $500 and up Model. Where a component or operation is unique to either the $20 Model or the $500 and up Model, it will be noted as such. Otherwise it should be considered applicable to both Models.

Figure 1:
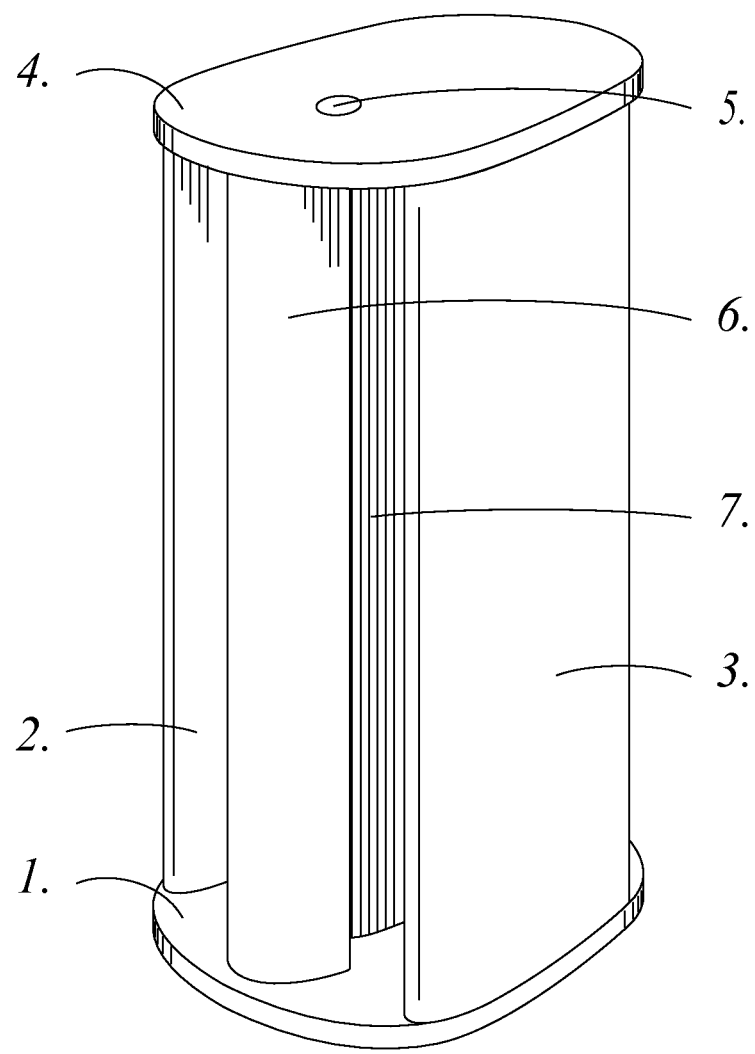

Hatched areas are those which, in the assembled apparatus, lie flush against, or inserted into the component facing them, and, in many cases are interlocked with them, or are cutaway views of something solid. Solid lines delineating surfaces curved toward or away from the viewer indicate their widest extents. Arrows labeled with letters indicate pressures, resulting directions of rotation or coil wrapping, all in the directions of the arrows. Items numbers provide a hierarchy of item detail, longer alphanumeric numbers indicating a more specific version or section of the same item. Items are:
1. Floor
2. Starboard wall
    2a. Starboard wall with its outer half flattened
3. Port wall
    3a. Port wall with its outer half flattened
4. Roof
5. Shaft
    5a. $500 and up Model shaft
    5b. $20 Model shaft
        5b1. $20 Model shaft-top
        5b2. $20 Model shaft-middle
        5b3. $20 Model shaft-bottom
    5c. $500 and up Model transmitting shaft
6. Forward nacelle
7. Oscillating wing
    7a. $500 and up Model oscillating wing
    7b. $20 Model oscillating wing
8. Aft nacelle
    8a. $500 and up Model aft nacelle
    8b. $20 Model aft nacelle
9. Pivot collar
10. Starboard roller
11. Port roller
12. Airfoil close to NACA 0020
13 Airfoil close to NACA 0040
14. Forward design circle
15. Aft design circle
16. Forward air gap
17. Aft air gap
18. Strut
19. Frame
    19a. $500 and up Model frame
        19a1. $500 Model top frame
        19a2. $500 Model intermediate frame
        19a3. $500 Model bottom frame
    19b. $20 Model frame
        19b1. $20 Model top frame
        19b2. $20 Model intermediate frame
        19b3. $20 Model bottom frame
20. Skin
21. Overrunning clutches
22. Bevel gears
23. Flywheel
24. Gear box
25. Generator
26. Transmission shaft
27. Centrifugal clutch
28. Environmentally protective chamber
29. PMDA, Permanent magnet dipole assembly
30. Magnet array holders
    30a. Forward magnet array holder
    30b. Aft magnet array holder
31. Compound magnet slot
32. Individual permanent magnet
33. Backing plates
    33a. Forward backing plate
    33b. Aft backing plate
34. Forward magnet array
    34a. Upper forward magnet array
    34b. Frame clearance spacer(s)
    34c. Lower forward magnet array(s)
35 Aft magnet array
36. Coil
    36a. Aft side of the coil
    36b. Forward side of the coil
    36c. Top of the coil
        36c1. Top side of the coil—starboard wrap
        36c2. Top side of the coil—port wrap
37. PMDA clearance
38. Forward coil notch
39. Aft coil notch
    39a. Aft coil notch arc
    39b. Aft coil notch depth
40. Shaft clearance holes
    40a. $20 Model top frame shaft clearance
    40b. $20 Model intermediate frame shaft clearance
    40c. $20 Model bottom frame shaft clearance
41. PMDA notches 41a. Aft nacelle PMDA notch
41b. Floor PMDA notch
41c. Roof PMDA notch
50. Conductive Path
  50a. Bushing on $20 Model wing frame
  50b. Bushing on $20 Model wing shaft
  50c. Conductive strips $20 Model wing shaft FIG. 1 is a perspective view of the outside of the preferred embodiment of the apparatus from forward, port of, and slightly above it which shows parts of the Floor (1.), Starboard wall (2.), Port wall (3.), Roof (4.), Shaft (5.), Forward nacelle (6.) and Oscillating wing (7.).

Figure 2:
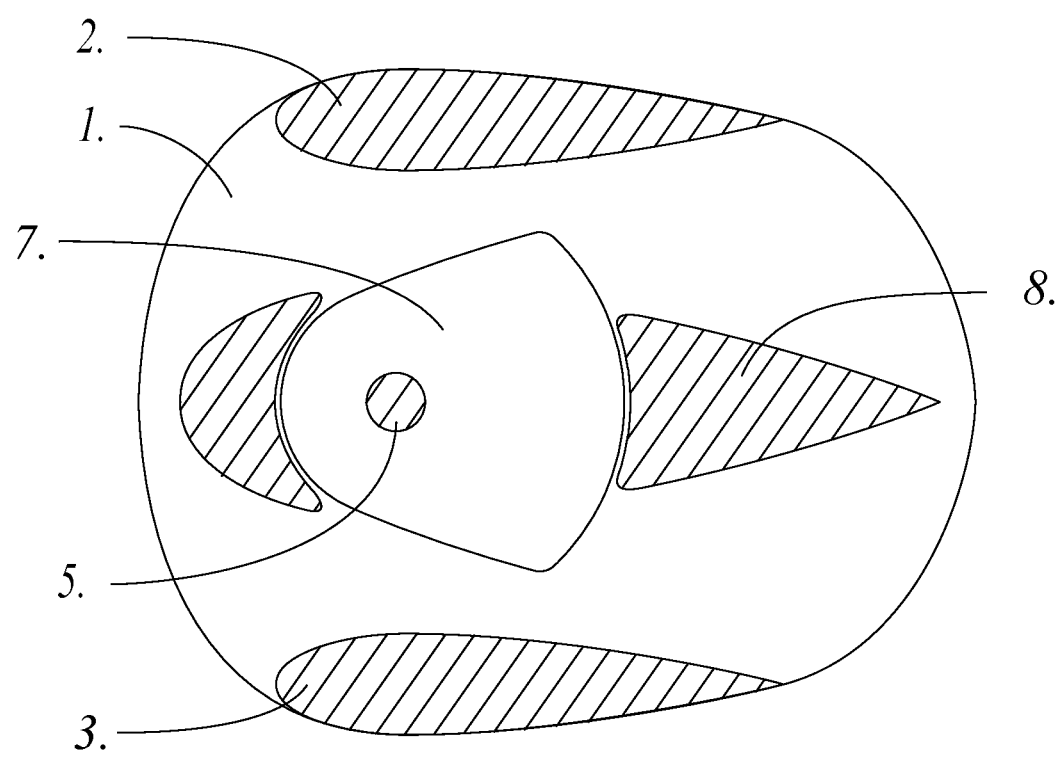

FIG. 2 is a top down view of the preferred embodiment of the apparatus with the Roof (4.) removed which shows the Floor (1.), Starboard wall (2.), Port wall (3.), Shaft (5.), Forward nacelle (6.), Oscillating wing (7.) and Aft nacelle (8.).

Figure 3:
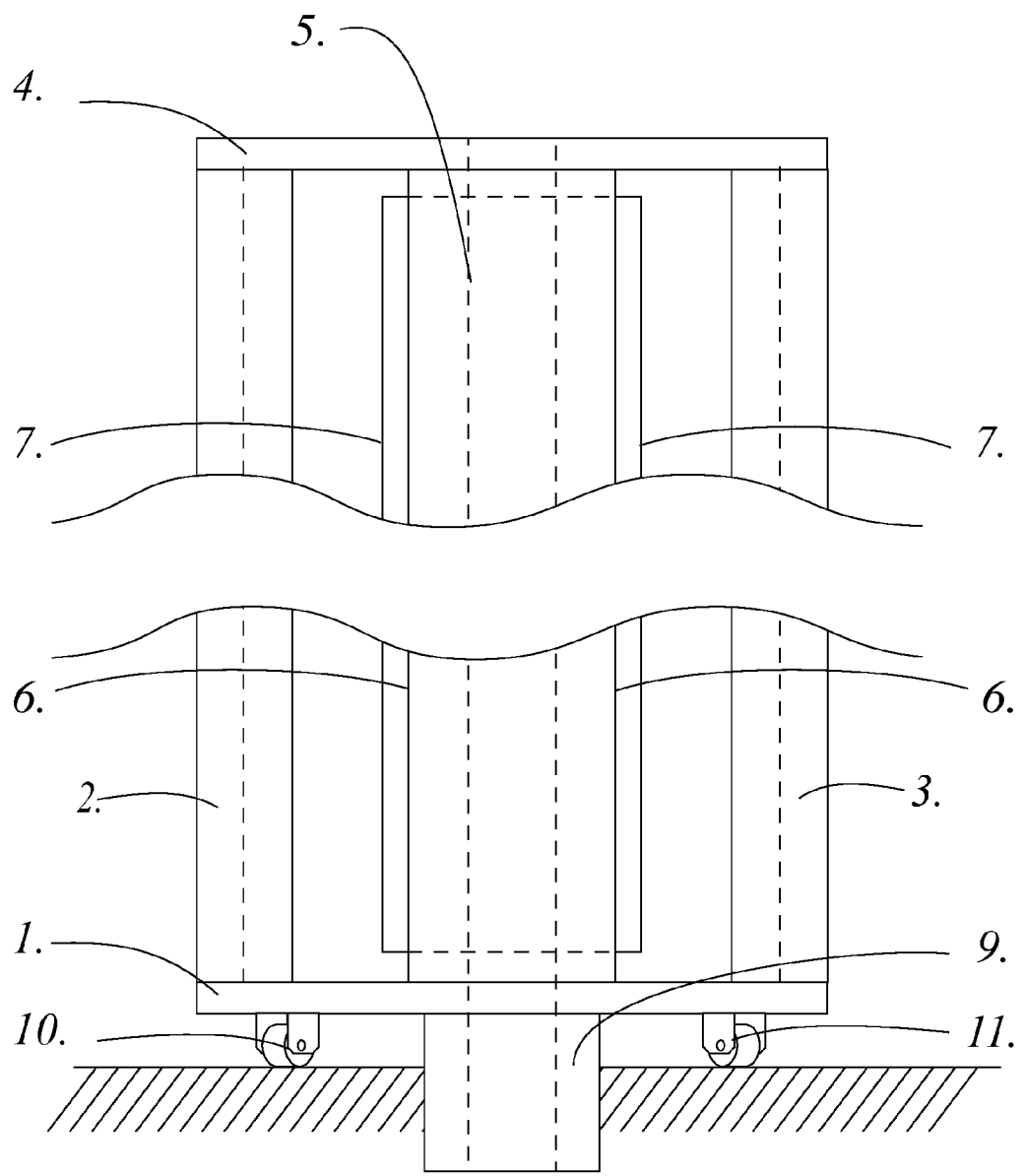

FIG. 3 is front view of the outside of the preferred embodiment of the apparatus which shows the Floor (1.), Starboard wall (2.), Port wall (3.), Forward nacelle (6.), Oscillating wing (7.) Pivot collar (9.), Starboard roller (10.). and Port roller (11.). Also shown as hidden lines is the Shaft (5.)

Figure 4:
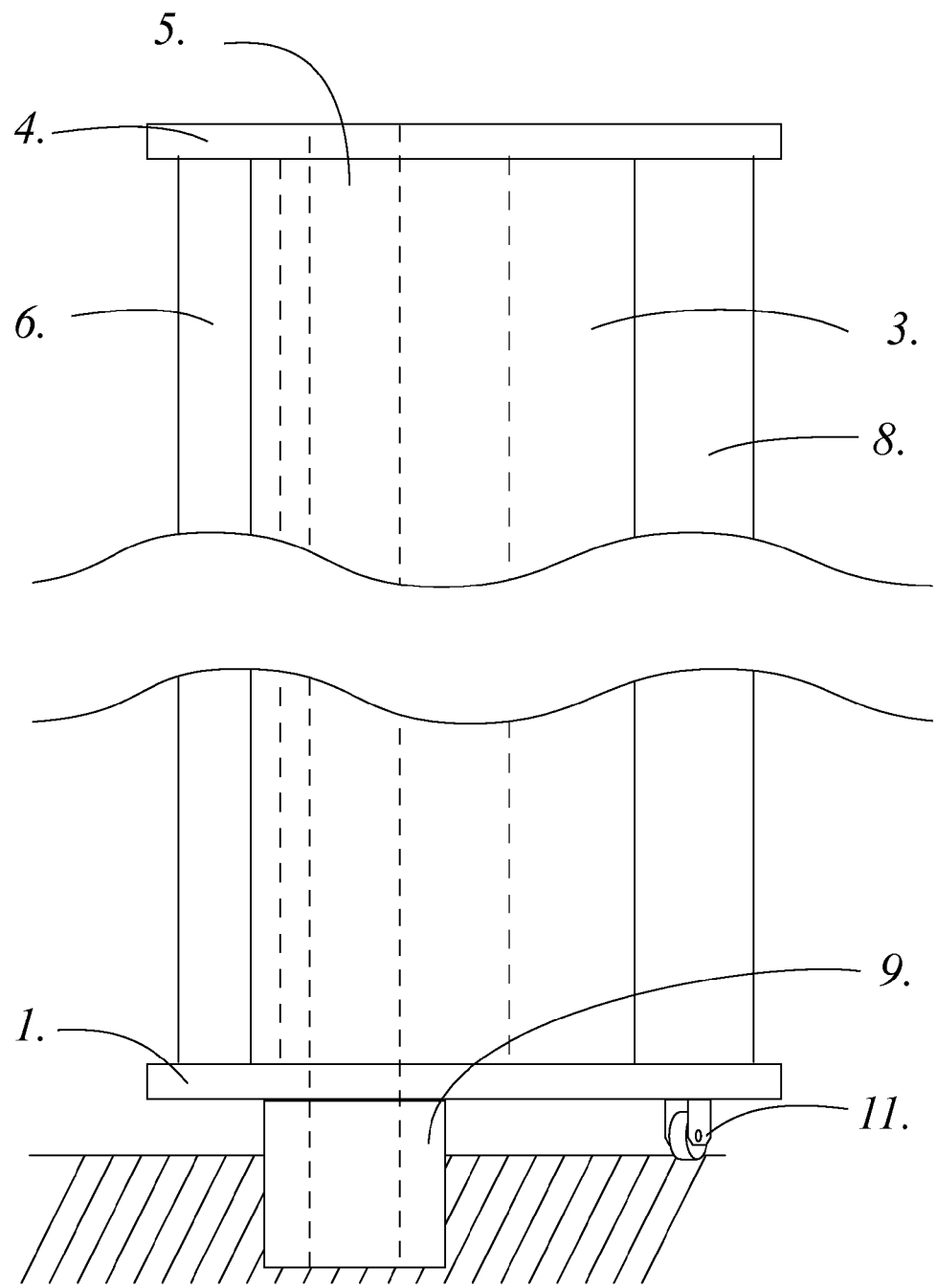

FIG. 4 is port side view of the outside of the preferred embodiment of the apparatus which shows parts of the Floor (1.), Port wall (3.), Forward nacelle (6.), Pivot collar (9.), Aft nacelle (8.) and Port roller (11.). Also shown as hidden lines is the Shaft (5.)

Figure 5:
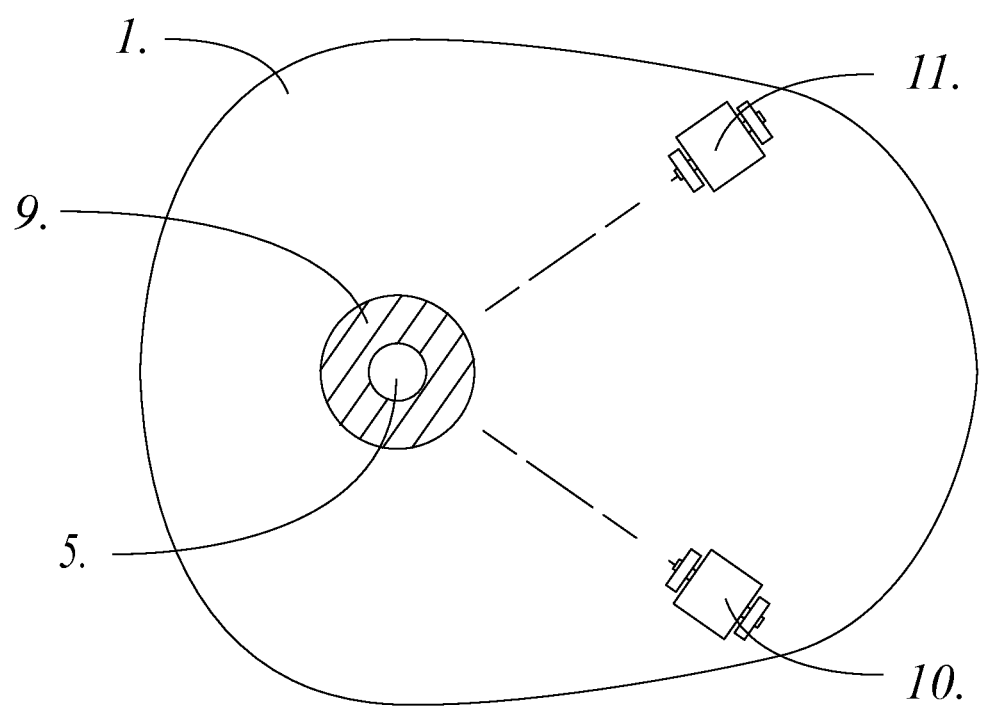

FIG. 5 is bottom view of the outside of the preferred embodiment of the apparatus which shows the Floor (1.), Shaft (5.), Pivot collar (9.), Starboard roller (10.). and Port roller (11.).

Figure 6:
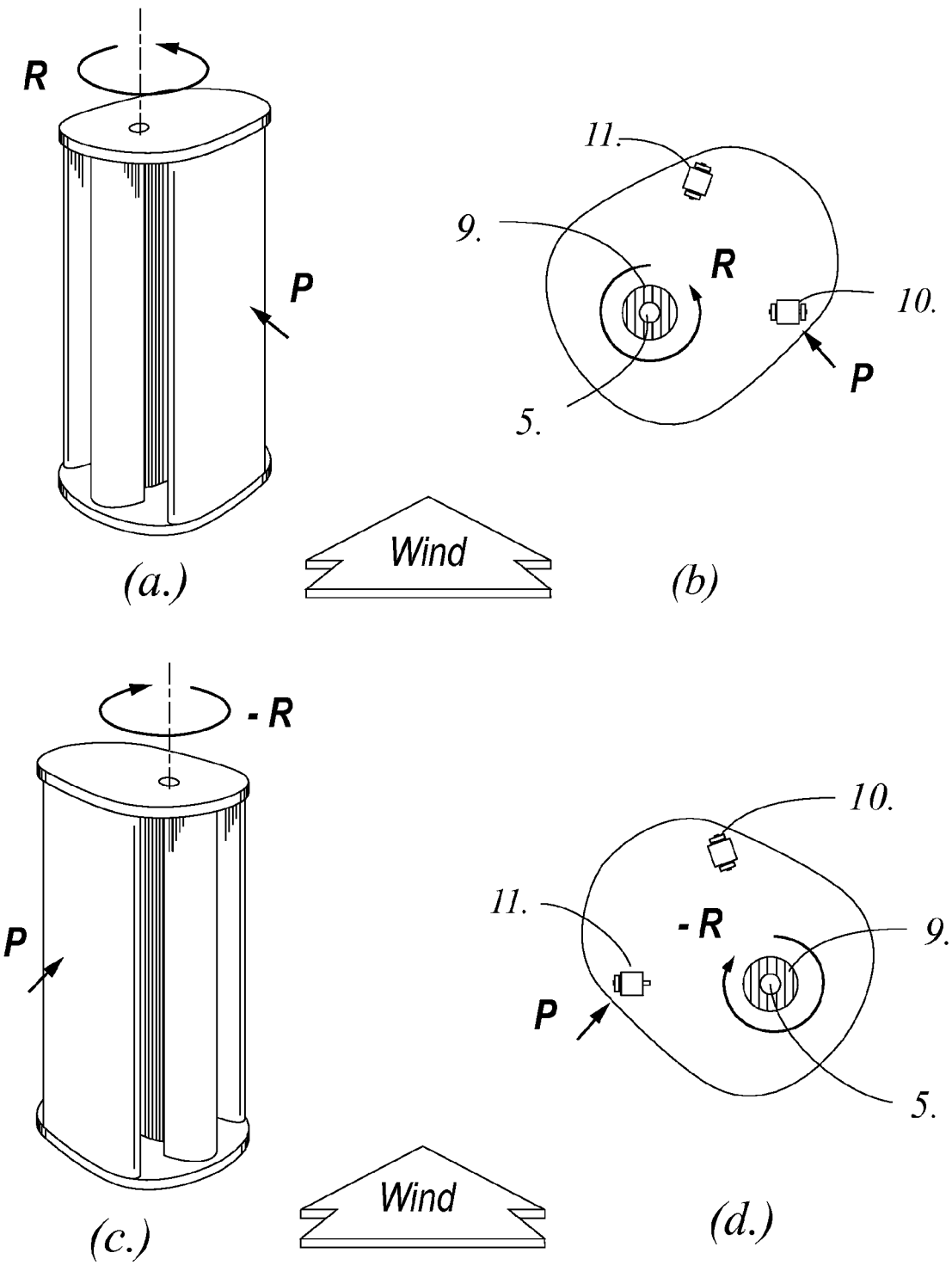

FIGS. 6 (a.), (b.), (c.) and (d.) show how the preferred embodiment of the apparatus reacts to being in a position other than face to the wind.

FIGS. 6 (b.) and (d.) show bottoms of the preferred embodiment of the apparatus, and the three points upon which they rest: the Pivot collar (9.) to which it is not attached, but rotates on it around the Shaft (5.) and the Starboard roller (10.) and the Port roller (11.) both of which have their axes pointed toward the Shaft (5.)

FIGS. 6 (a.) and (b.) show wind on its port side exerting a pressure P against the port side causing the machine to rotate R in a looking down counterclockwise direction until the machine is face to the wind.

FIGS. 6 (c.) and (d.), show wind on its starboard side exerting a pressure P against the starboard side causing the machine to rotate −R in a looking down clockwise direction until the machine is face to the wind.

Figure 7:
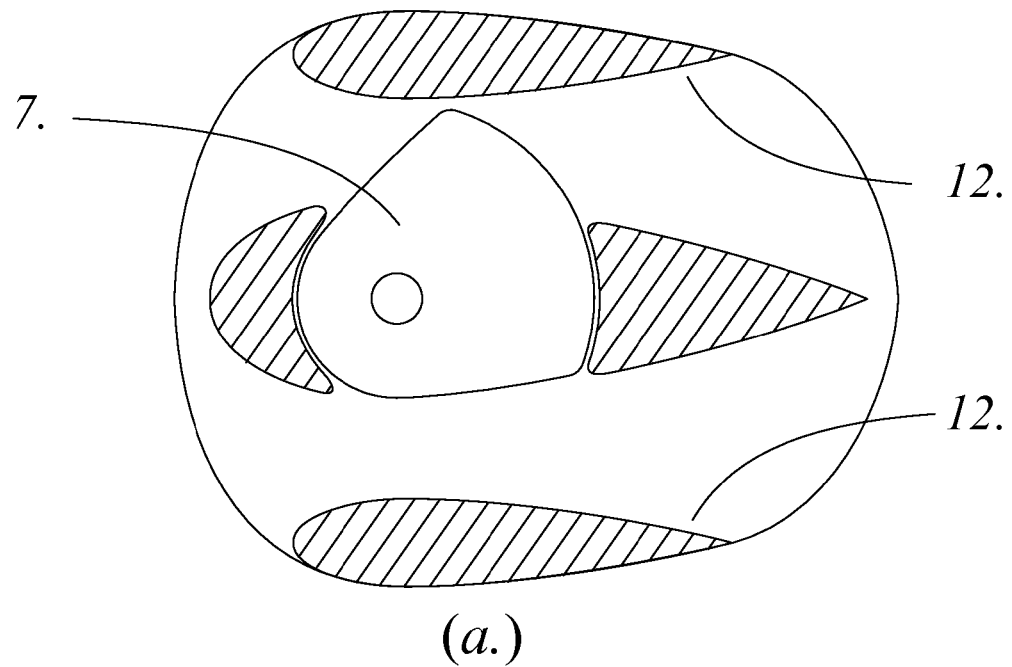
Figure 7:
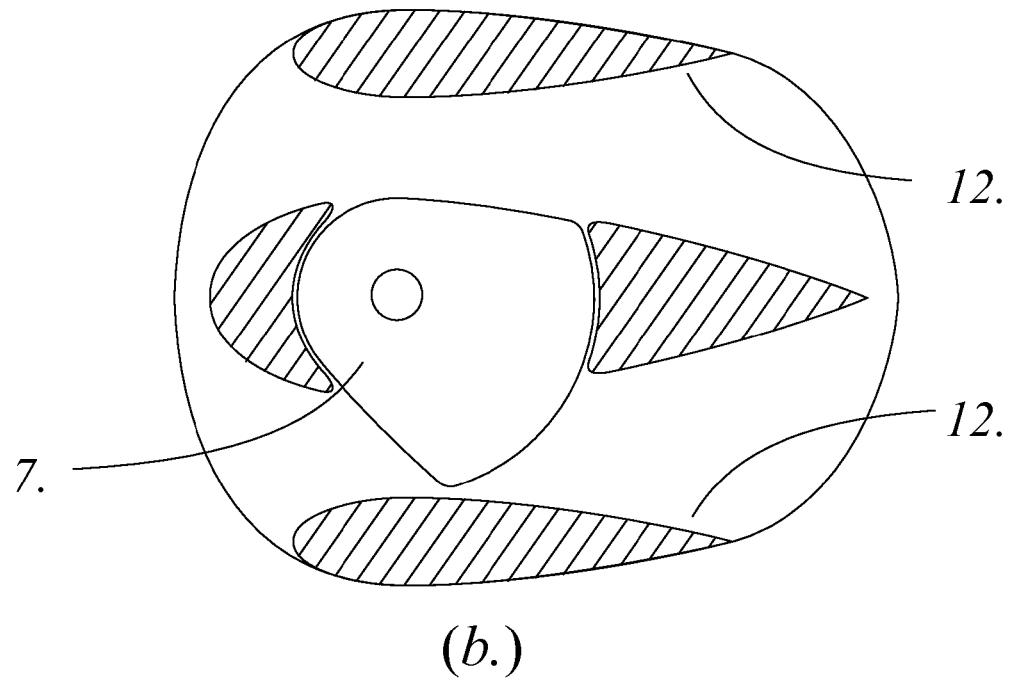

FIGS. 7 (a.) and (b.) each provide the same view as FIG. 2, except that the Oscillating wing (7.) is shown in its most starboard and most port positions respectively. In addition they show the outlines of the preferred embodiments of both the Starboard wall (2.) and the Port Wall (3.) being a streamlined symmetrical Airfoils close to NACA 0020 (12.).

Figure 8:
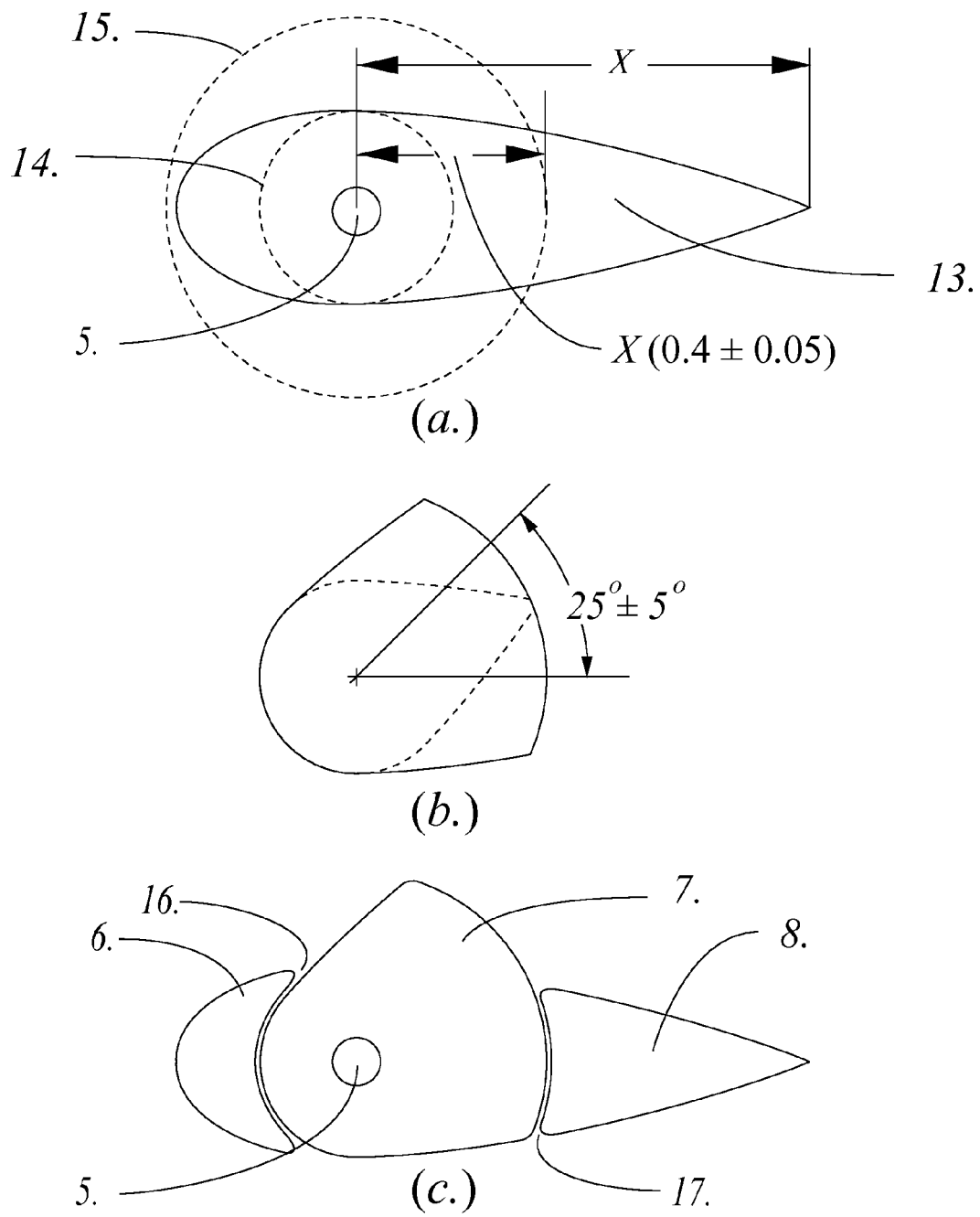

FIGS. 8 (a.), (b.) and (c.) show the method for creating the outlines of the preferred embodiment of the Forward nacelle (6.), Oscillating wing (7.) and the Aft nacelle (8.) using a streamlined symmetrical Airfoil close to NACA 0040 (13.): dividing it with design circles, slicing it, copying and rotating one of the sliced sections, combining the rotated copy with the original, establishing clearances, and rounding off the side corners.

FIG. 8 (a.) shows two design circles, a Forward design circle (14.) and a Aft design circle (15.) drawn with their center at a point midway between the widest points on this Airfoil close to NACA 0040 (13.) the diameter of the Forward design circle (14.) being set to the width of the airfoil at that point and the radius of the Aft design circle (15.) set 40±5% of the distance from the center to the aft most point on the Airfoil (13.)

FIG. 8 (b.) shows this remaining middle section copied, the copied section rotated around the Shaft (5.) at an angle of 53±5 degrees to the centerline, and both combined.

FIG. 8 (c.) shows the section forward of the Forward design circle (14.) becoming the basis for the outline of the preferred embodiment of the Forward nacelle (6.), the section aft of the Aft design circle (15.) becoming the basis for the outline of the preferred embodiment of the Aft nacelle (8.), the just modified middle section becoming the basis for the outline of the preferred embodiment of the Oscillating wing (7.), and the center point becoming the preferred embodiment of the axis of the Shaft (5.). It also shows the Forward air gap (16.) cut between the section about to become the preferred embodiment of the Forward nacelle (6.) outline and the section about to become the preferred embodiment of the Oscillating wing (7.) outline, the aft air gap (17.) cut between the section about to become the preferred embodiment of the Oscillating wing (7.) outline and the section about to become the preferred embodiment of the Aft nacelle (8.) outline. Finally it shows the corners of the preferred embodiment of the Forward nacelle (6.) trimmed so as not to interfere with the preferred embodiment of the Oscillating wing (7.) as it rotates to its port most and starboard most positions, approximately 25 degrees off center to either side, and the corners of the preferred embodiment of the Oscillating wing (7.) and all of the corners of the preferred embodiment of the Aft nacelle (8.) except the aft most rounded moderately.

Figure 9:
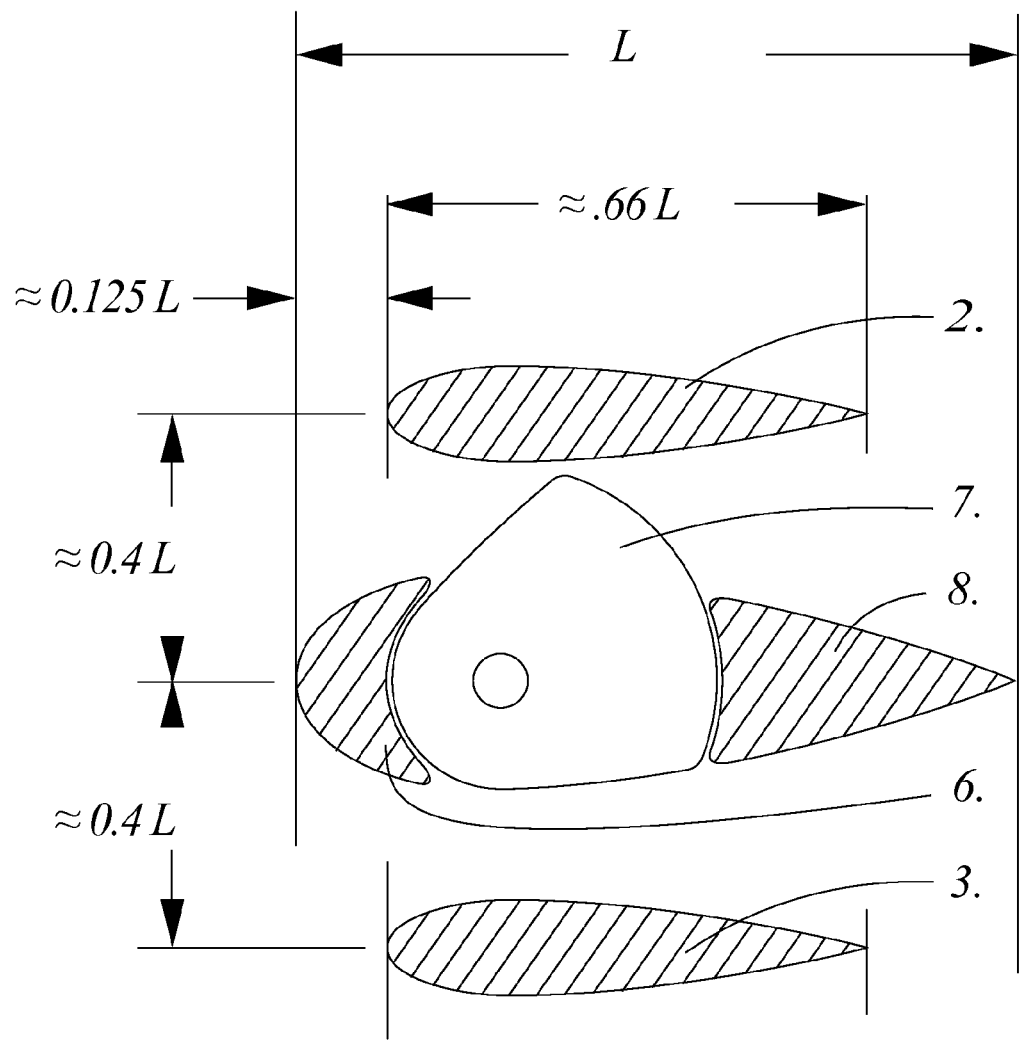

FIG. 9 shows the relative dimensioning and positioning of the preferred embodiment of the Starboard wall (2.), Port wall (3.), Forward nacelle (6.), Oscillating wing (7.) and Aft nacelle (8.). The independent variable is the length (L) of the combination of the preferred embodiments of the Forward nacelle (6.), the Oscillating wing (7.) and the Aft nacelle (8.). The preferred embodiments of the Starboard wall (2.) and the Port wall (3.) have lengths, which must be the same, that are each approximately 66% (≈0.66 L) of the length (L) of the combination of the preferred embodiments of the Forward nacelle (6.), the Oscillating wing (7.) and the Aft nacelle (8.), and are positioned with their foremost edges approximately 12.5% (≈0.125 L) of the length (L) of the combination of the preferred embodiments of the Forward nacelle (6.), the Oscillating wing (7.) and the Aft nacelle (8.) aft of the foremost point of the Forward nacelle (6.), with their midpoints approximately 40% (≈0.40 L) of the length (L) of the combination of the preferred embodiments of the Forward nacelle (6.), the Oscillating wing (7.) and the Aft nacelle (8.) to the sides of a line extending from the foremost point of the Forward nacelle (6.) to the aft corner of the Aft nacelle (8.).

Figure 10:
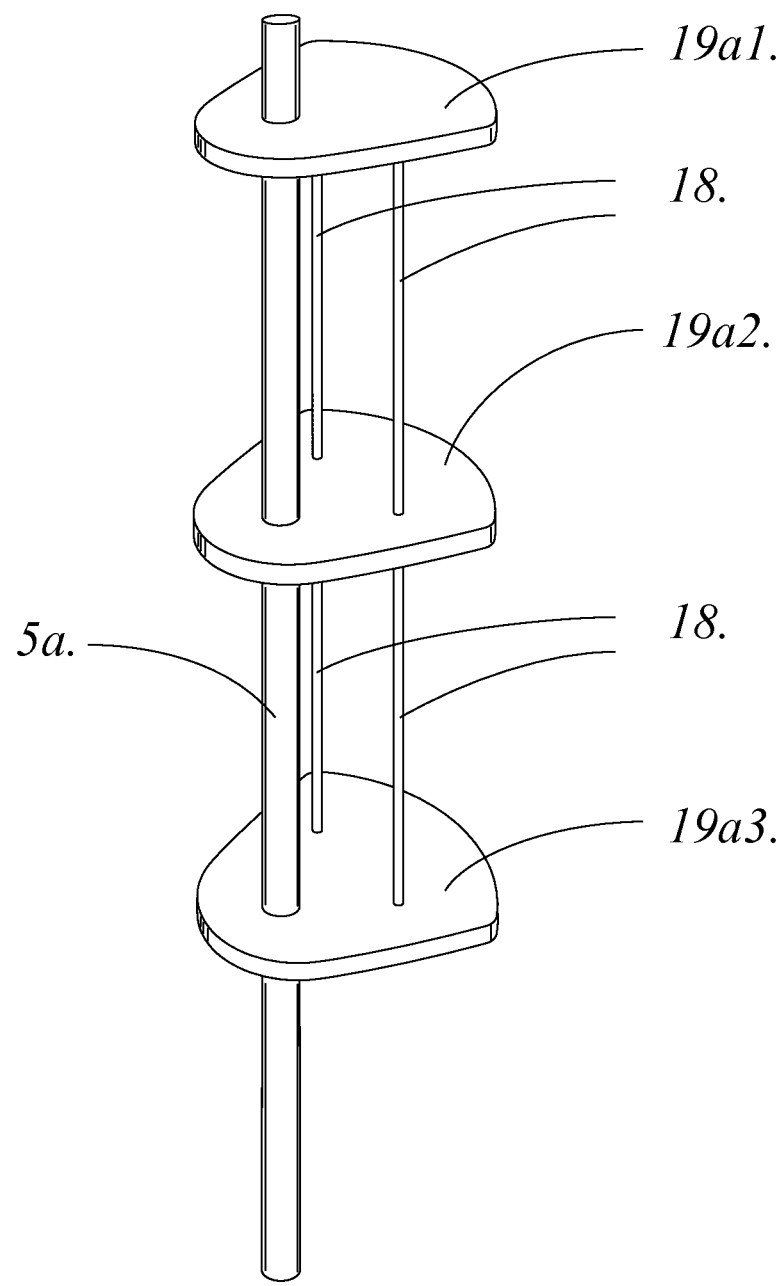

FIG. 10 is a perspective view of the skeleton of the preferred embodiment of the $500 and up Model oscillating wing (7a.) from forward, port of, and slightly above it which shows the $500 and up Model shaft (5a), the Struts (18.), the $500 and up Model top frame (19a1.), a $500 and up Model intermediate frame (19a2.) and the $500 and up Model bottom frame (19a3.).

Figure 11:
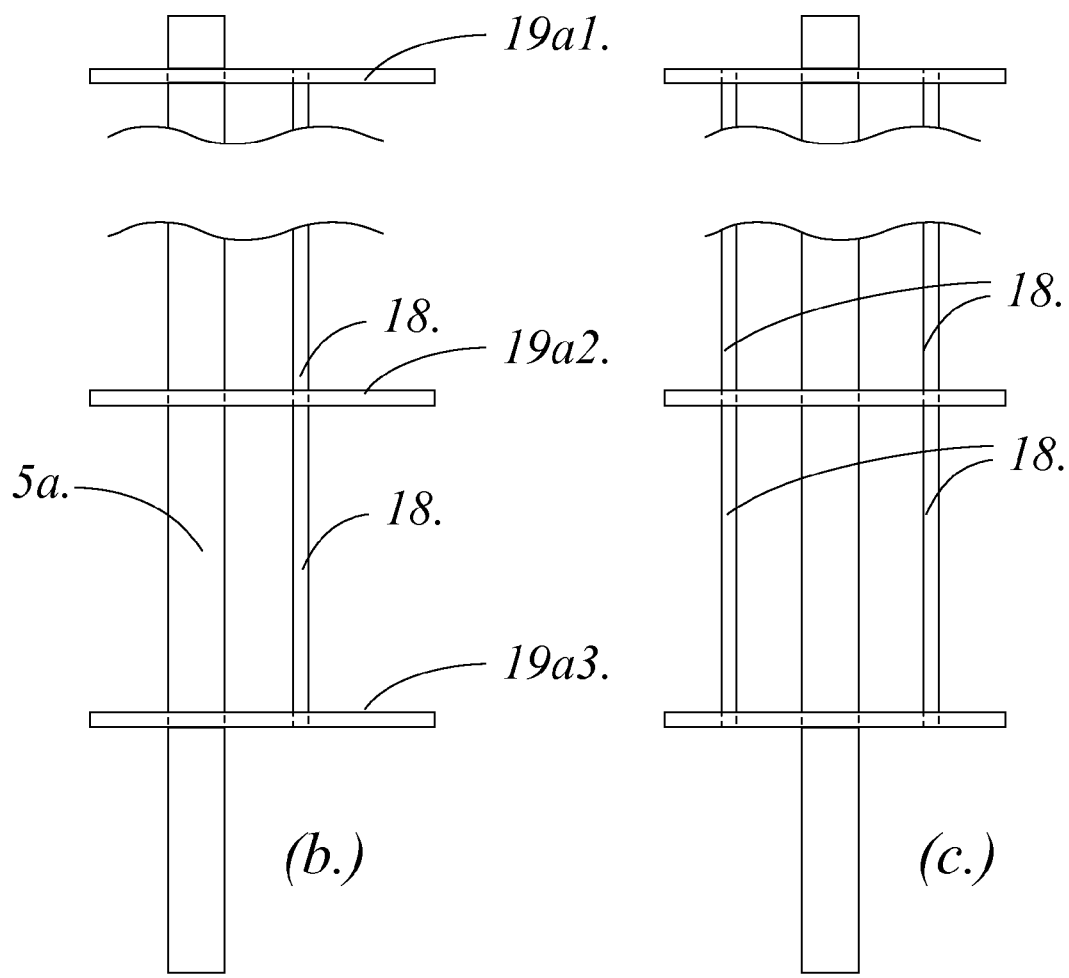

FIGS. 11 (a.), (b.) and (c.) are top, side and front views respectively of the skeleton of the preferred embodiment of the $500 and up Model oscillating wing (7a.) that shows the Struts (18.), the $500 and up Model top frame (19a1.), a $500 and up Model intermediate frame (19a2.) and the $500 and up Model bottom frame (19a3.) as the latter three (19a1., 19a2. and 19a3.) are attached to the $500 and up Model shaft (5a.).

Figure 12:
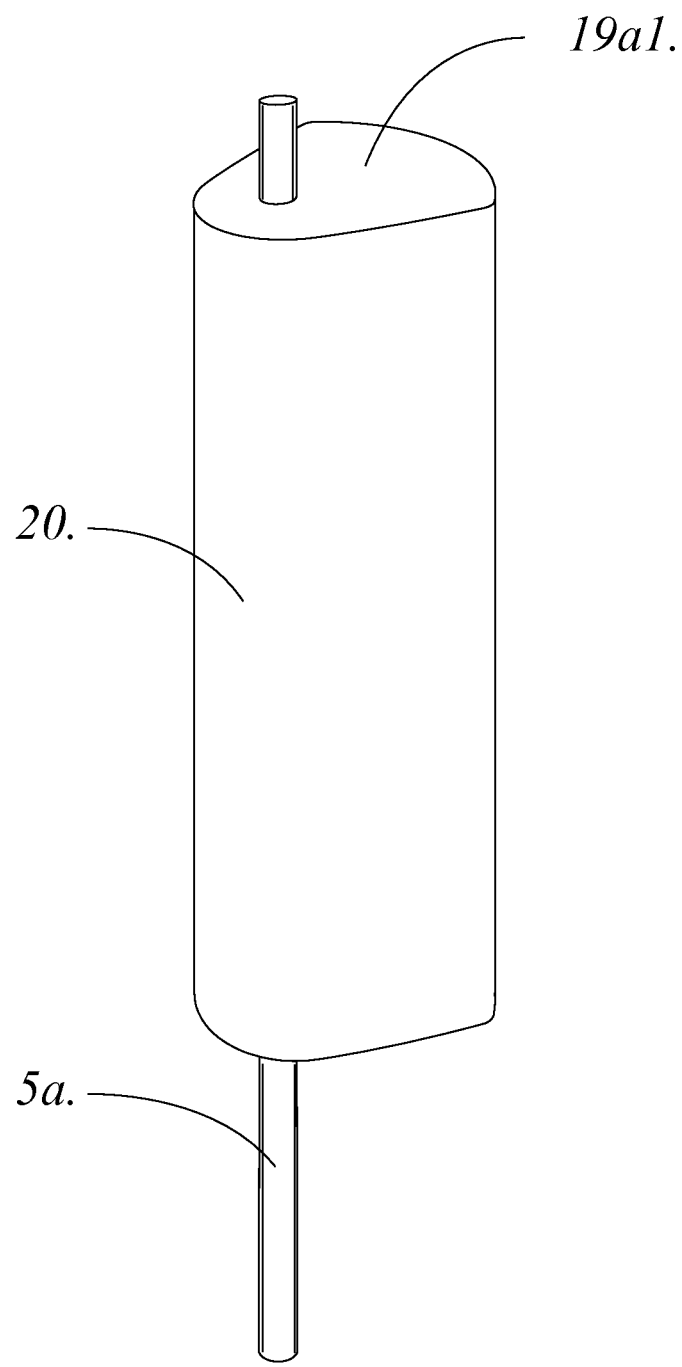

FIG. 12 is a perspective view of the preferred embodiment of the $500 and up Model oscillating wing (7a.) from forward, port of, and slightly above it which shows the $500 and up Model shaft (5a.), the $500 and up Model top frame (19a.) and the Skin (20.).

Figure 13:
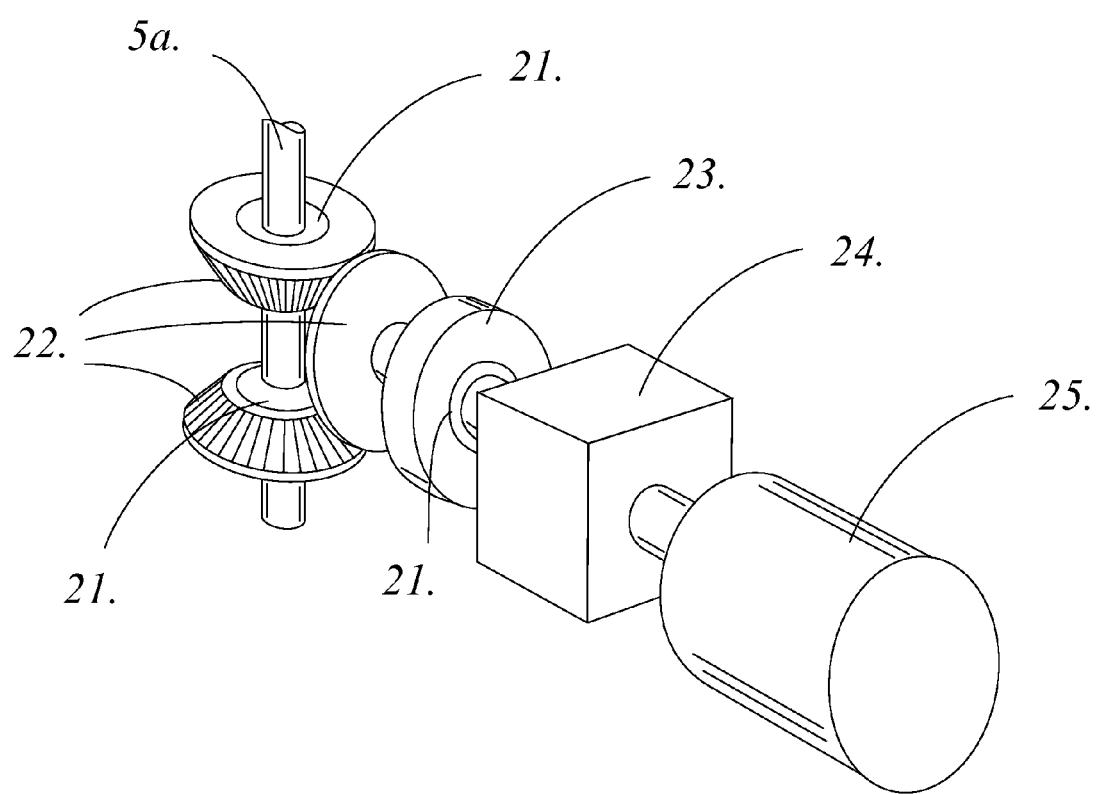

FIG. 13 is a perspective view of a means of converting the mechanical energy of the $500 and up Model oscillating wing (7a.) to electrical energy; an assembly of Overrunning clutches (21.), Bevel gears (22.), a Flywheel (23.), a Gear box (24.) and a (electrical) Generator (25.).

Figure 14:
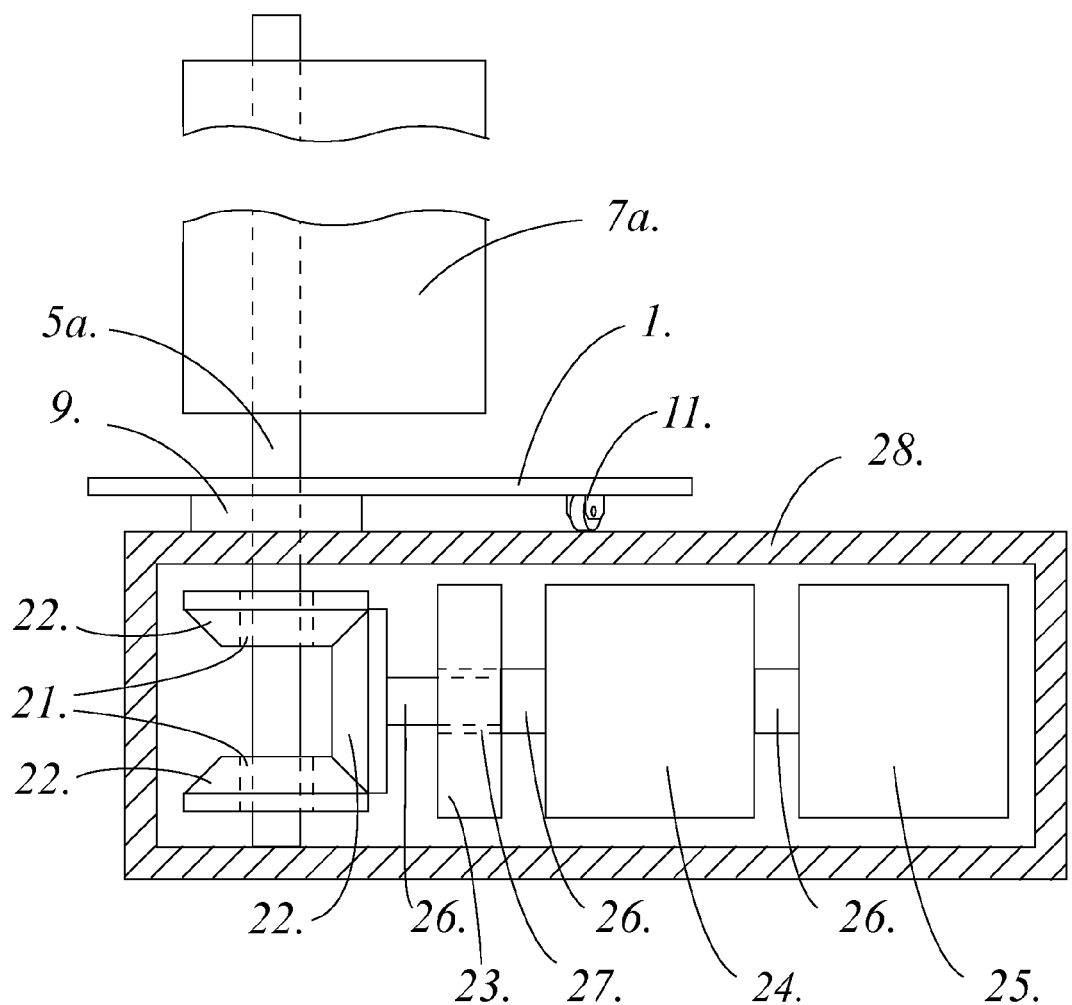

FIG. 14 is a side view of the same assembly which shows the path of transmission of mechanical energy from where it is captured by a $500 and up Model oscillating wing (7a.), to where it is converted into electrical energy by the (electrical) Generator (25.), the assembly enclosed in an environmentally protective chamber (28.) with its near side removed, the environmentally protective chamber serving as the ground for the $500 and up Model.

Figure 15:
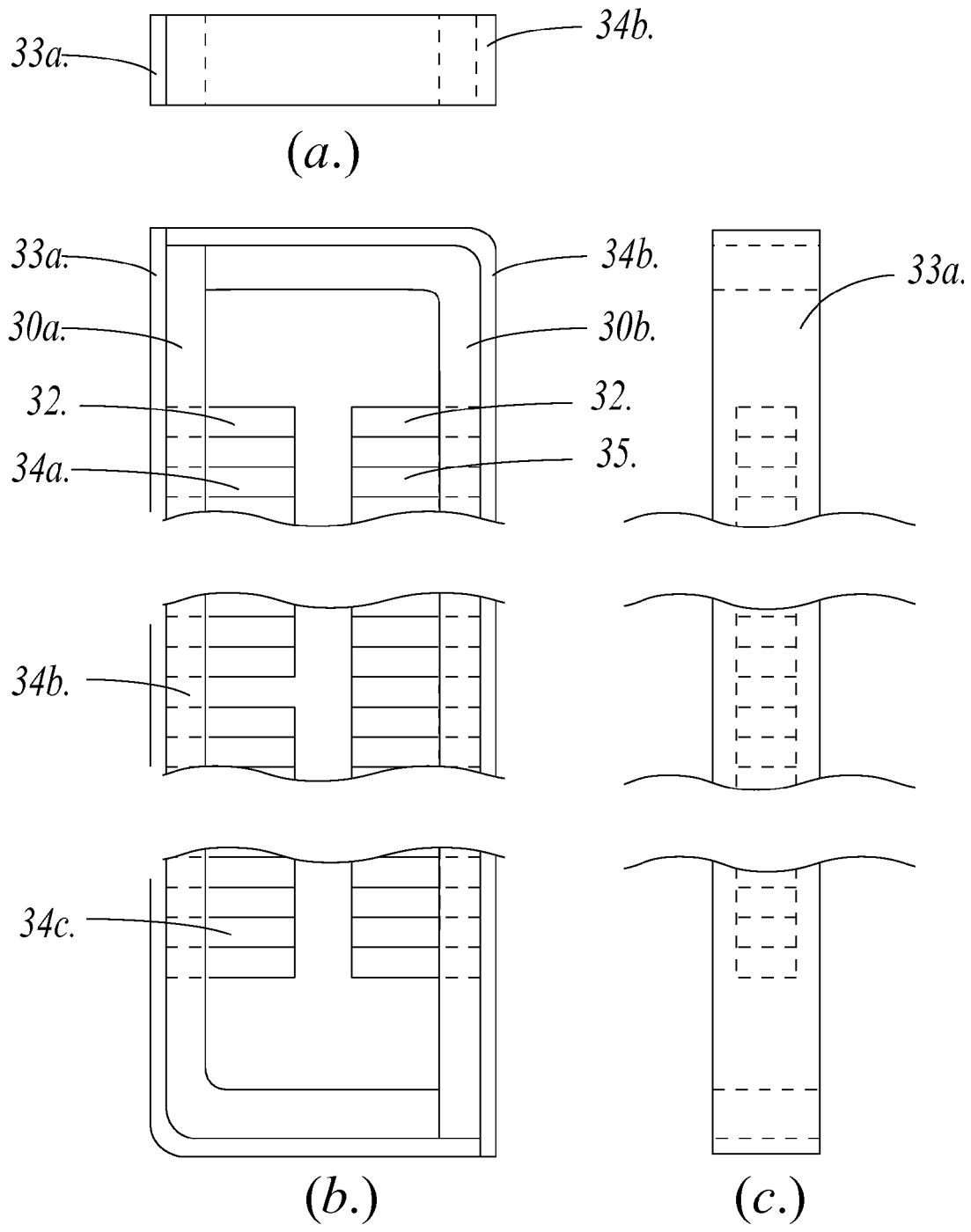

FIGS. 15 (a.), (b.) and (c.) are top, port side and front views of preferred embodiment of the Permanent magnet dipole assembly, "PMDA" (29.).

Figure 16:
Figure 16:
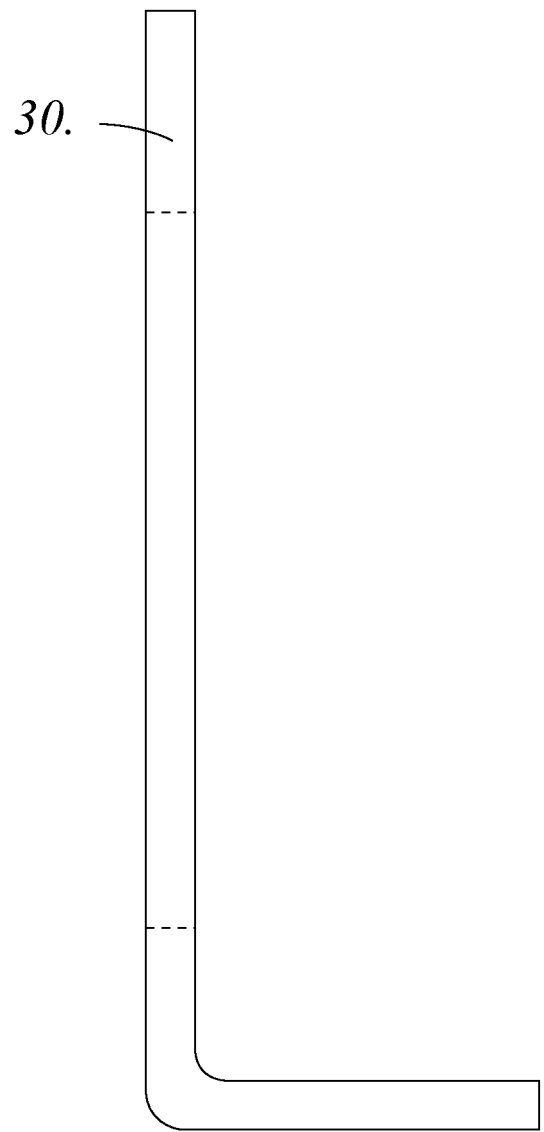
Figure 16:
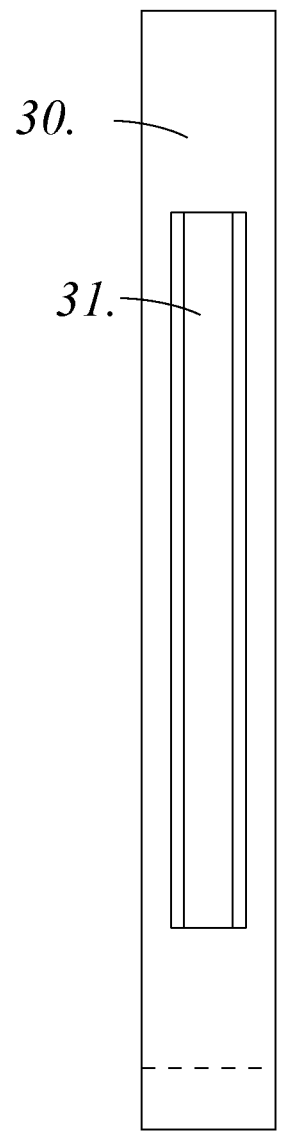

FIGS. 16 (a.), (b.) and (c.) are top, port side and front views of the preferred embodiment of a Magnet array holders (30.).

Figure 17:
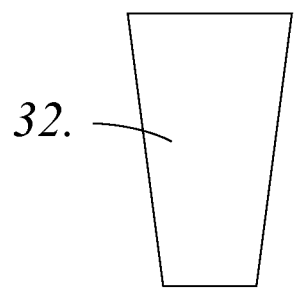
Figure 17:
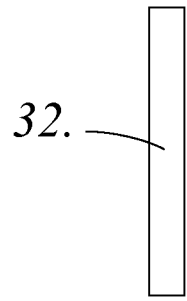
Figure 17:
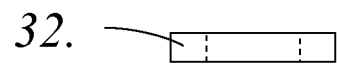

FIGS. 17 (a.), (b.) and (c.) are top, side and front views of an the preferred embodiment of an Individual permanent magnet (33.)

Figure 18:
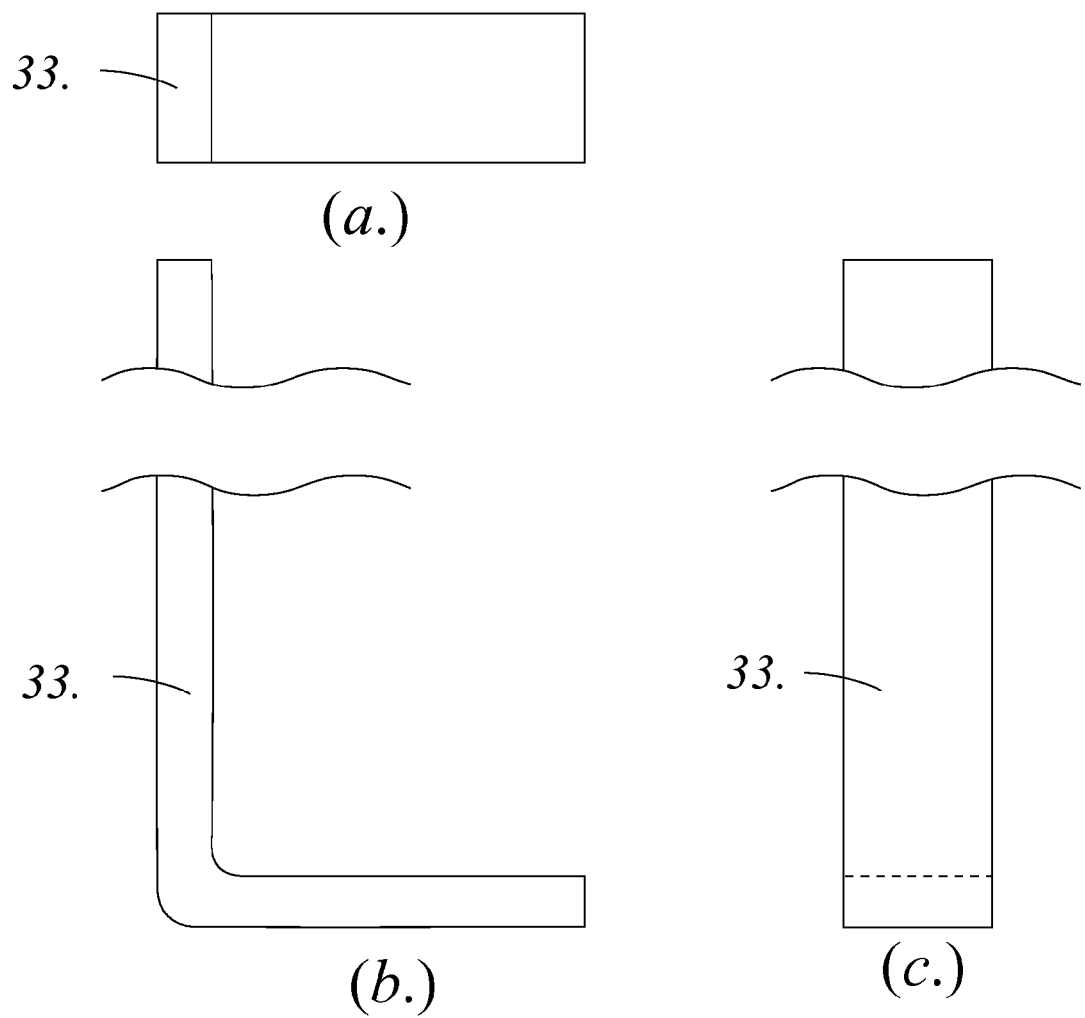

FIGS. 18 (a.), (b.) and (c.) are top, port side and front views of the preferred embodiment of a Backing plate (33.).

Figure 19:
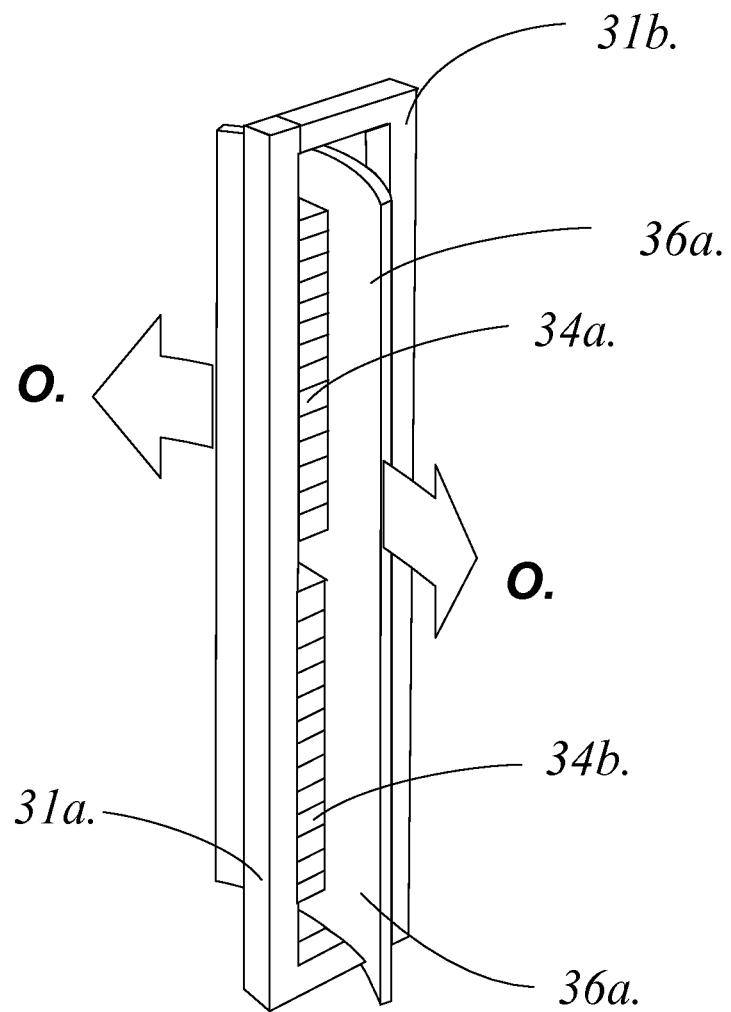

FIG. 19 shows the oscillation (O.) of the Aft side of the Coil (36a.) through the PMDA (29.) from a perspective forward, port of, and slightly above them.

Figure 20:
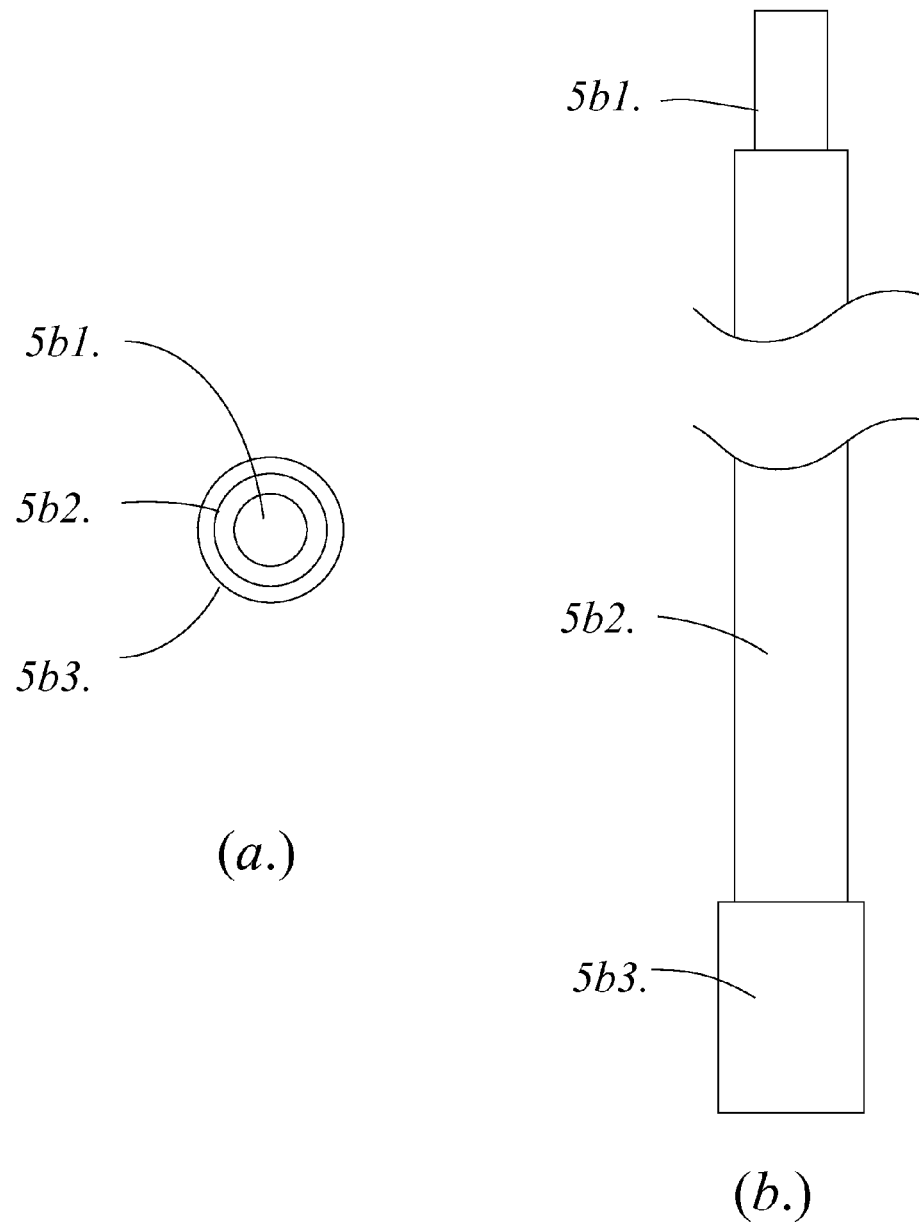

FIGS. 20 (a.) and (b.) are respectively, top and side views of the elements of the preferred embodiment of the $20 Model shaft (5b.).

Figure 21:
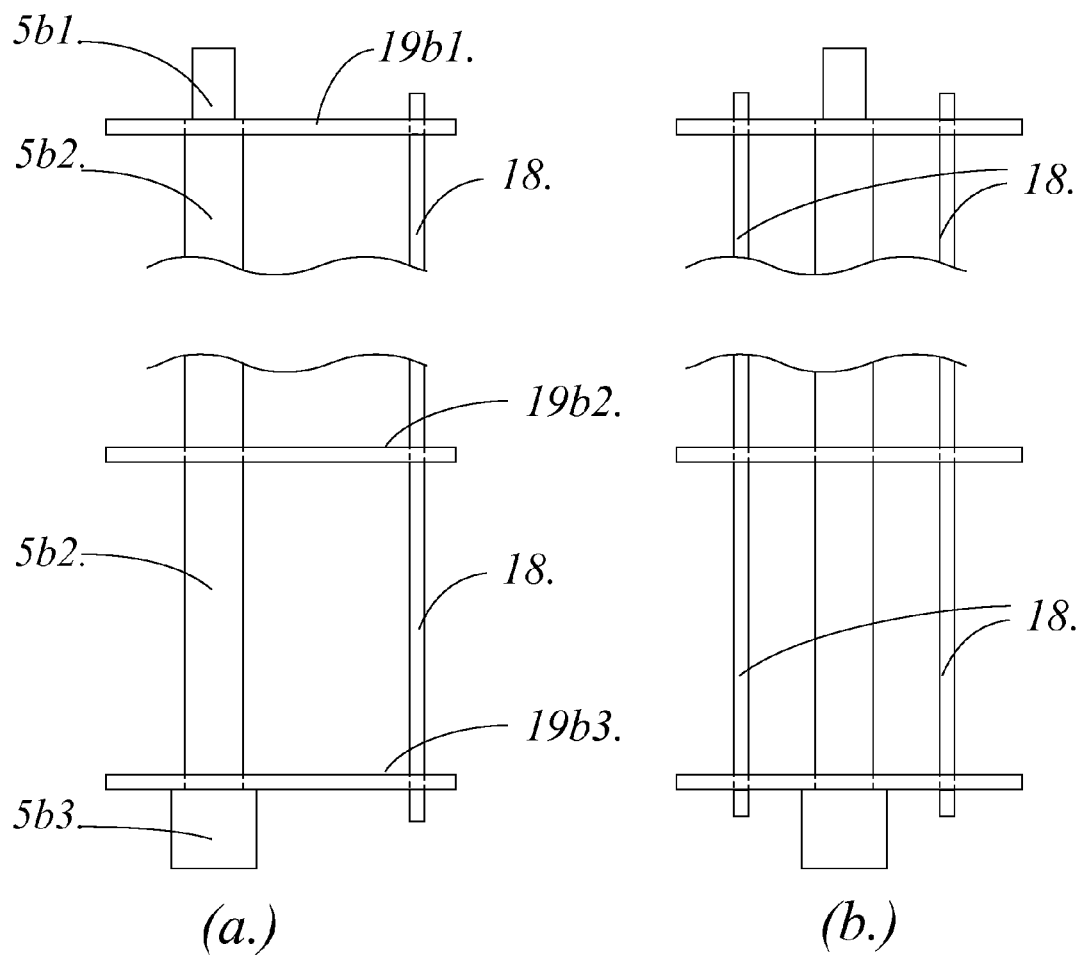

FIGS. 21 (a.) and (b.) are port side and front views respectively of the skeleton of the preferred embodiment of the $20 Model oscillating wing (7b.) that show the Struts (18.), the $20 Model top frame (19b1.), a $20 Model intermediate frame (19b2.) and the $20 Model bottom frame (19b3.) when the latter three (19b1., 19b2. and 19b3.) are slid over and rest on the $20 Model shaft (5b.).

Figure 22:
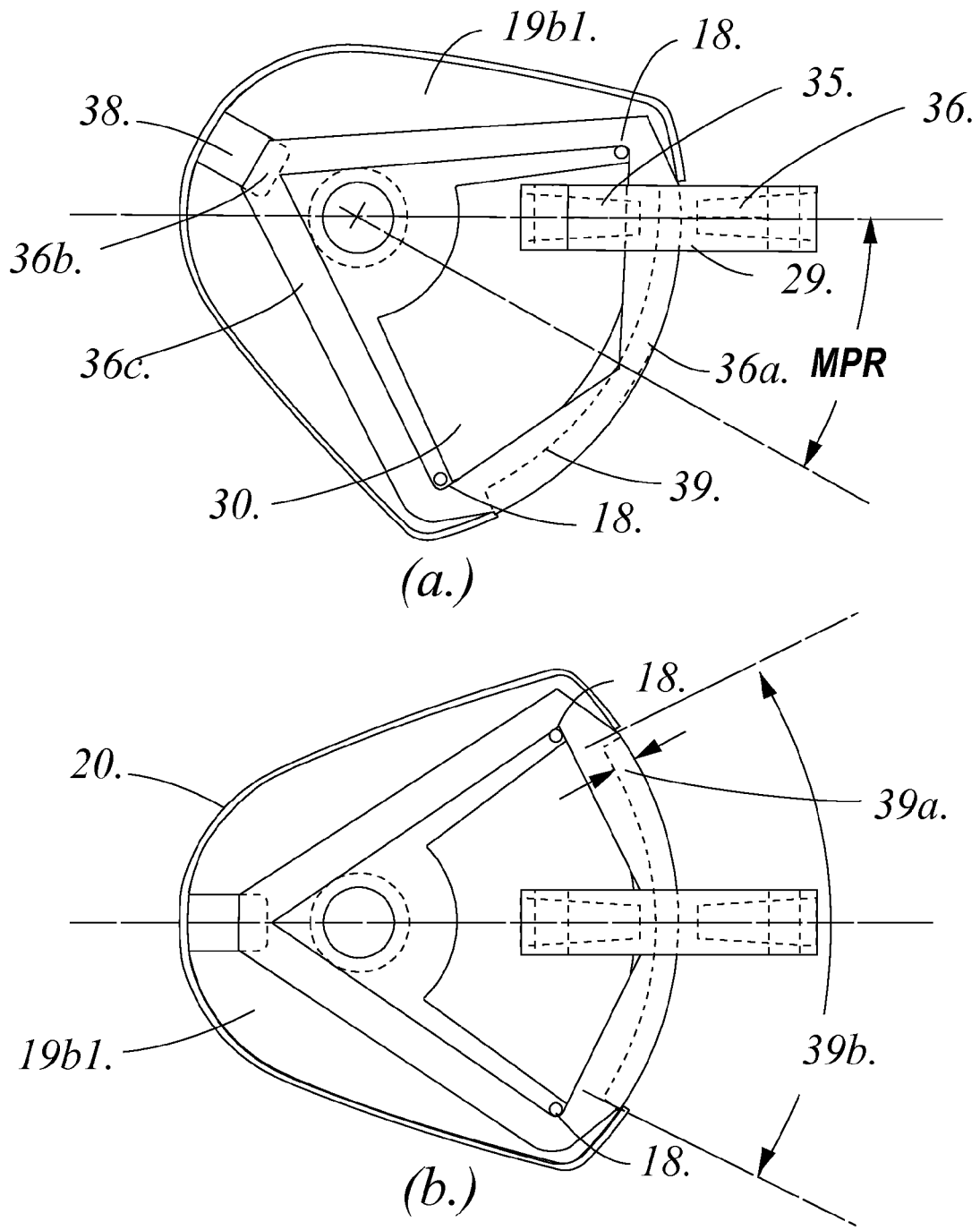

FIGS. 22 (a.) and (b.) are top down views of the preferred embodiment of the PMDA (29.) extending over both sides of the Aft side of the coil (36a.), avoiding coming into direct contact with the Top side of the coil (36c.) and the $20 Model top frame (19b1.) with the latter's PMDA clearance (30,) as the $20 Model oscillating wing (7b,) rotates from the angle of its Maximum practical rotation (MPR) to port (FIG. 22 (a.)) and back to its centered position (FIG. 22 (a.)).

Figure 23:
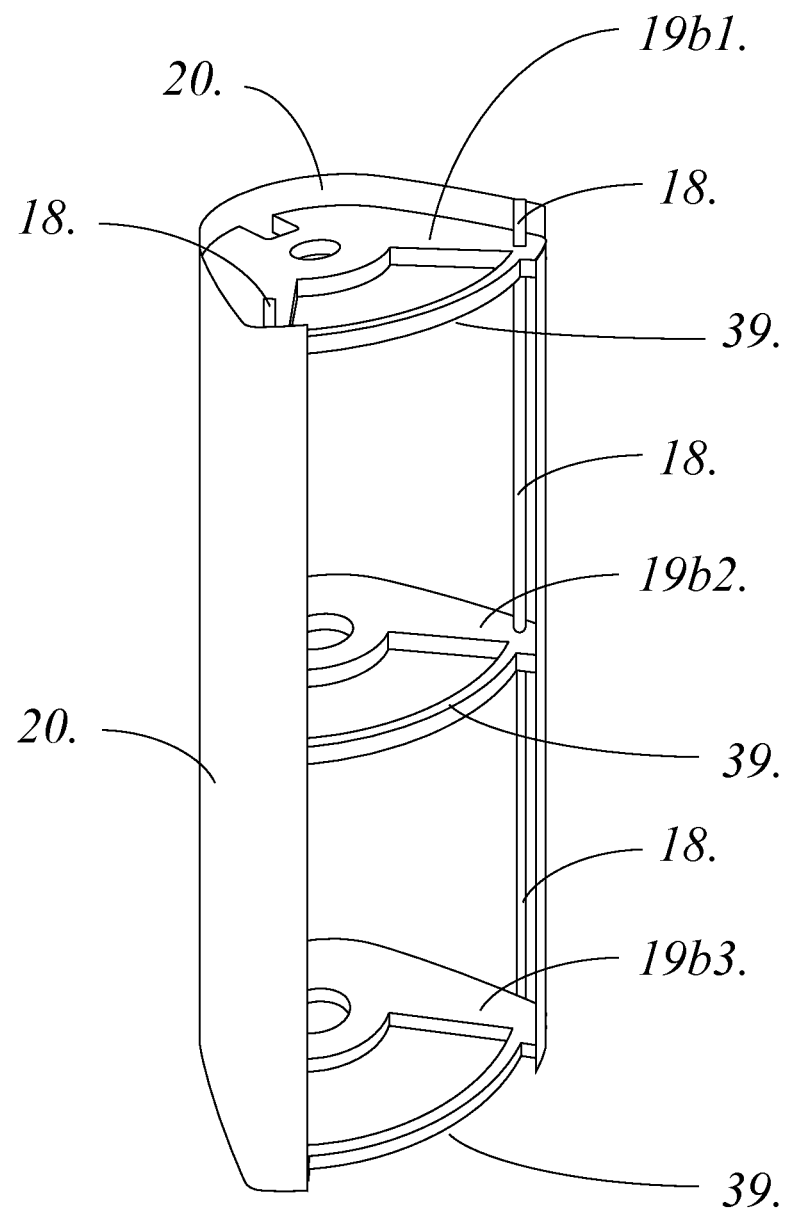

FIG. 23 is an aft of, port of, and slightly above perspective view of the preferred embodiment skeleton of the $20 Model oscillating wing (7b.) covered with its Skin (20.) which does not wrap completely around the $20 Model frames (19b.), but stops at the edges of their Aft coil notches (39.).

Figure 24:
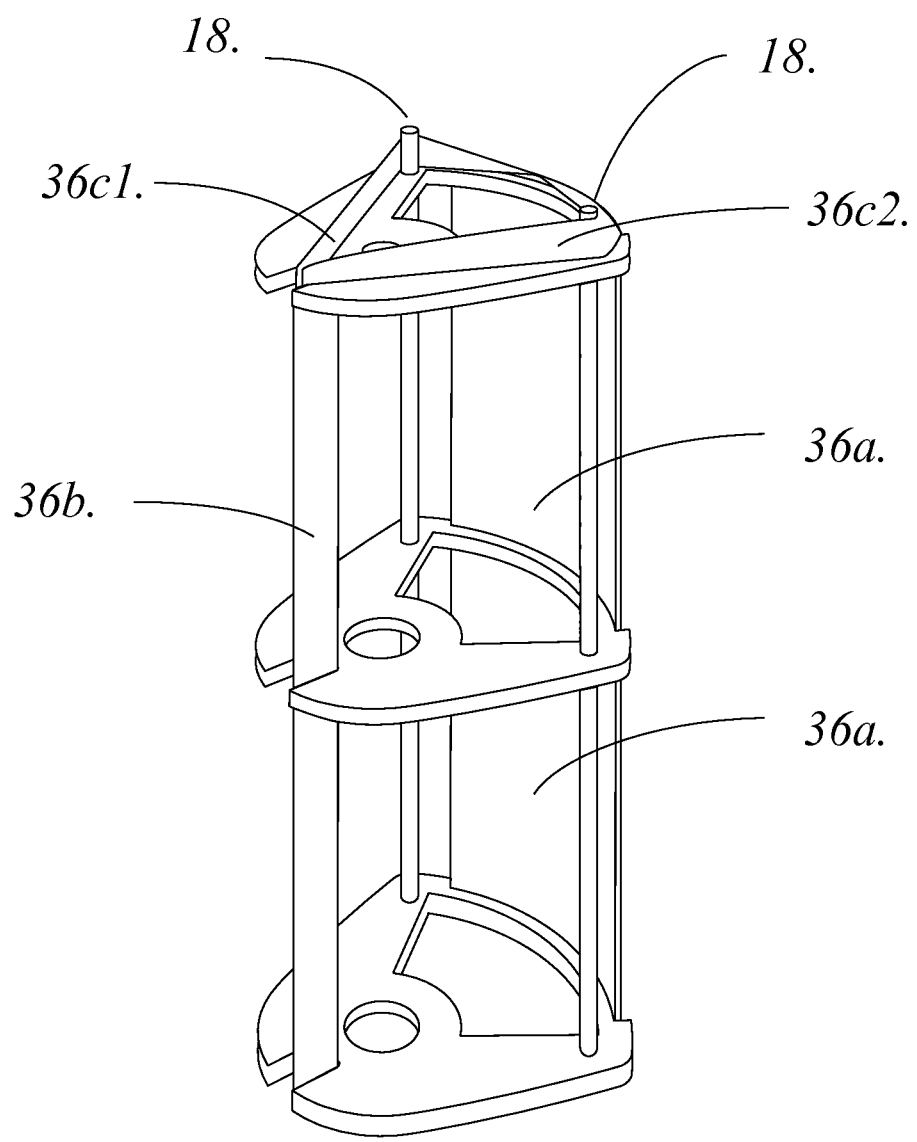

FIG. 24 shows from the perspective of being forward of, on the port side of, and slightly above the skeleton of the preferred embodiment of the $20 Model oscillating wing (7b.) wrapped with the preferred embodiment of the Coil (36.).

Figure 25:
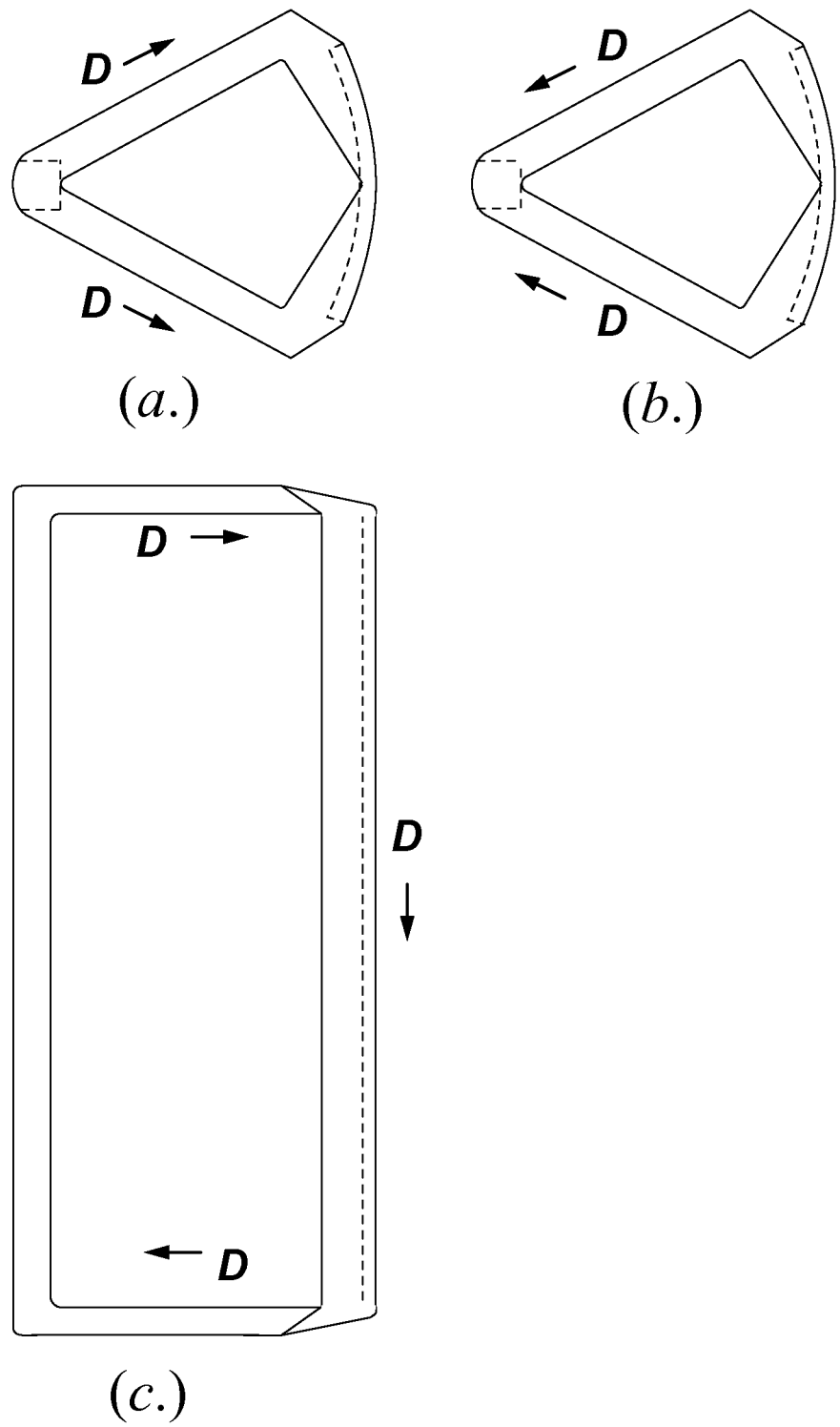

FIGS. 25 (a.), (b.) and (c.) are top, bottom and port side views of the Coil (36.) showing the directions (D) in which the preferred embodiment is wrapped.

Figure 26:
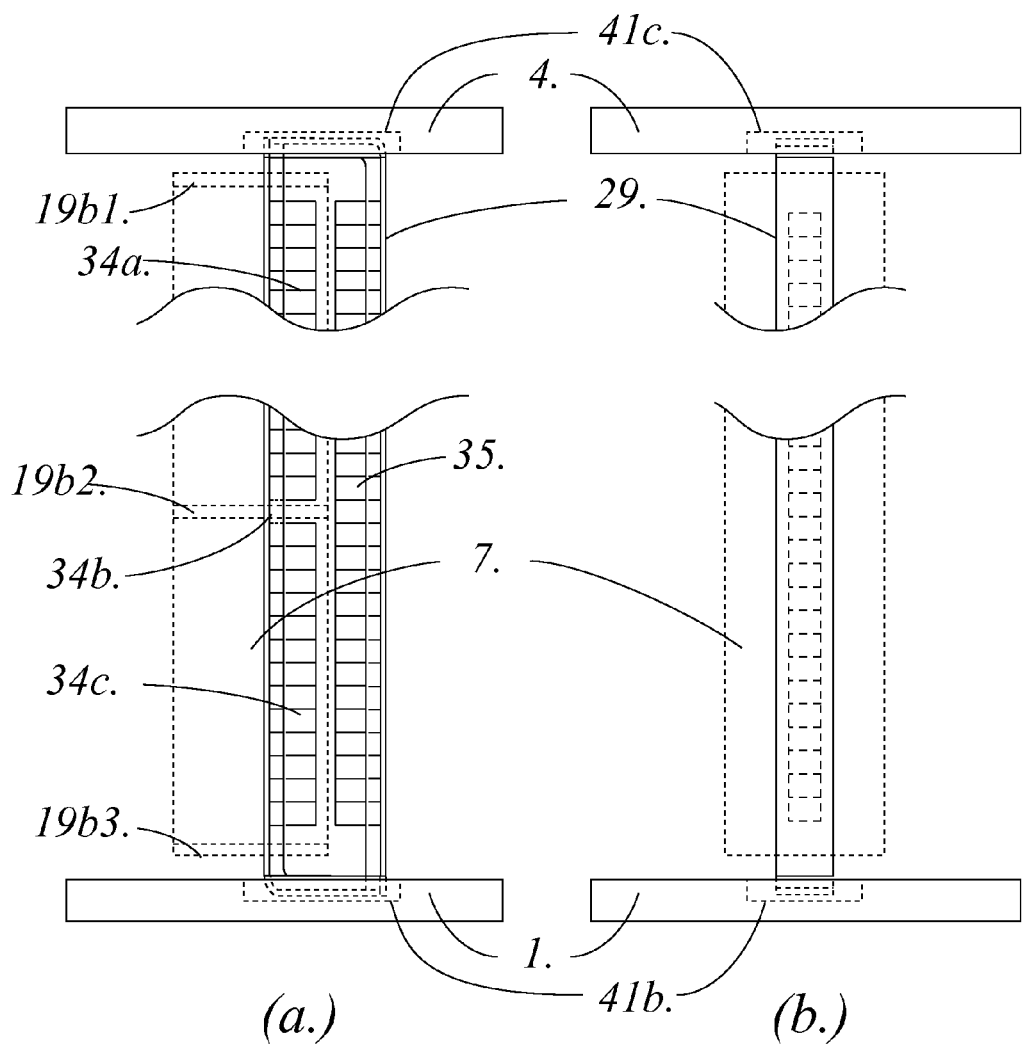

FIG. 26 (a.) and (b.) are respectively side and front views showing the preferred embodiment of positioning the PMDA (29.) relative to the Floor (1,) and the Roof (4,) fitting into the Floor PMDA notch (41b.) and the Roof PMDA notch (41a.) and relative to the $20 Model oscillating wing (7b.) having the Forward magnet array (34.) positioned inside the $20 Model oscillating wing (7b.) just forward of the Aft side of the Coil (36a.).

Figure 27:
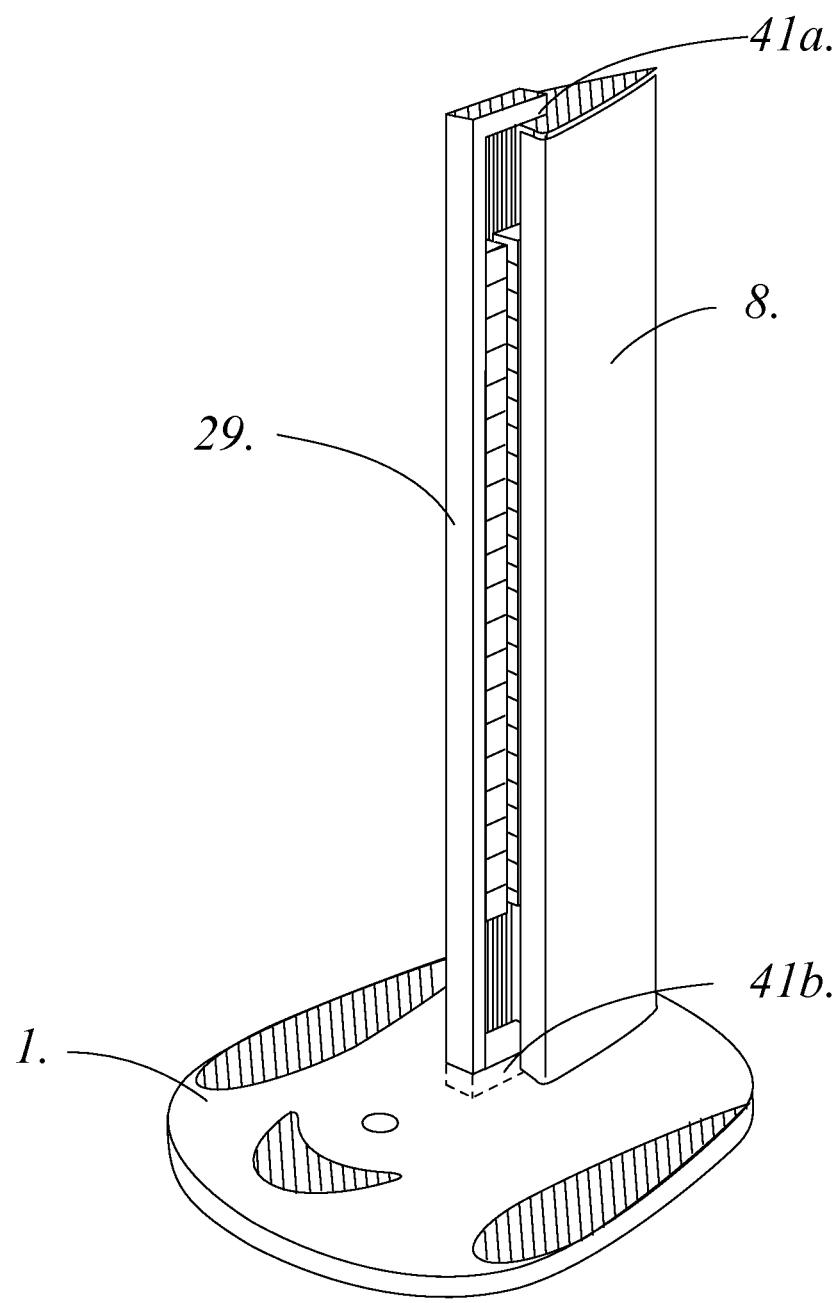

FIG. 27 shows the preferred embodiment of positioning the PMDA (29.) relative to Aft nacelle (6.) fitting into the Aft nacelle PMDA notch (41a.).

Figure 28:
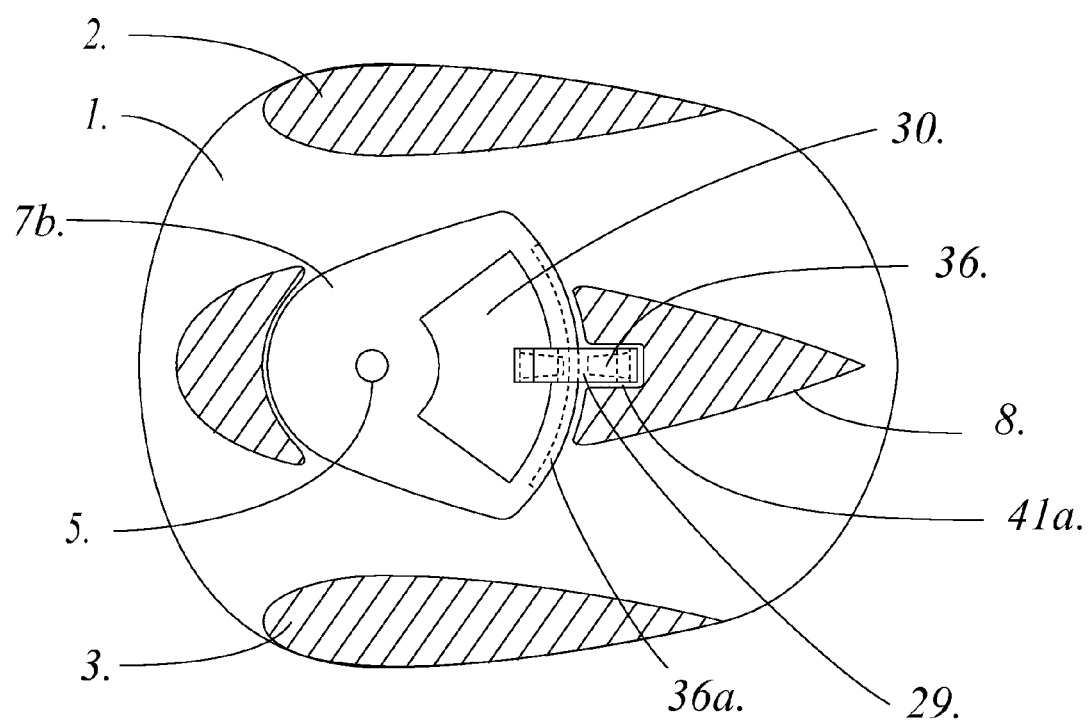

FIG. 28 provides the same top down view as FIG. 2 except that it is specific to the $20 Model and shows the position of the PMDA (29.) in the preferred embodiment such that the forward side of the Aft magnet array (35.) lies flush with the forward face of the Aft nacelle (8.) and that the Aft side of the coil (36a.) is free to rotate between the aft side of the Forward magnet array(s) and the forward side of the Aft magnet array (35.).

Figure 29:
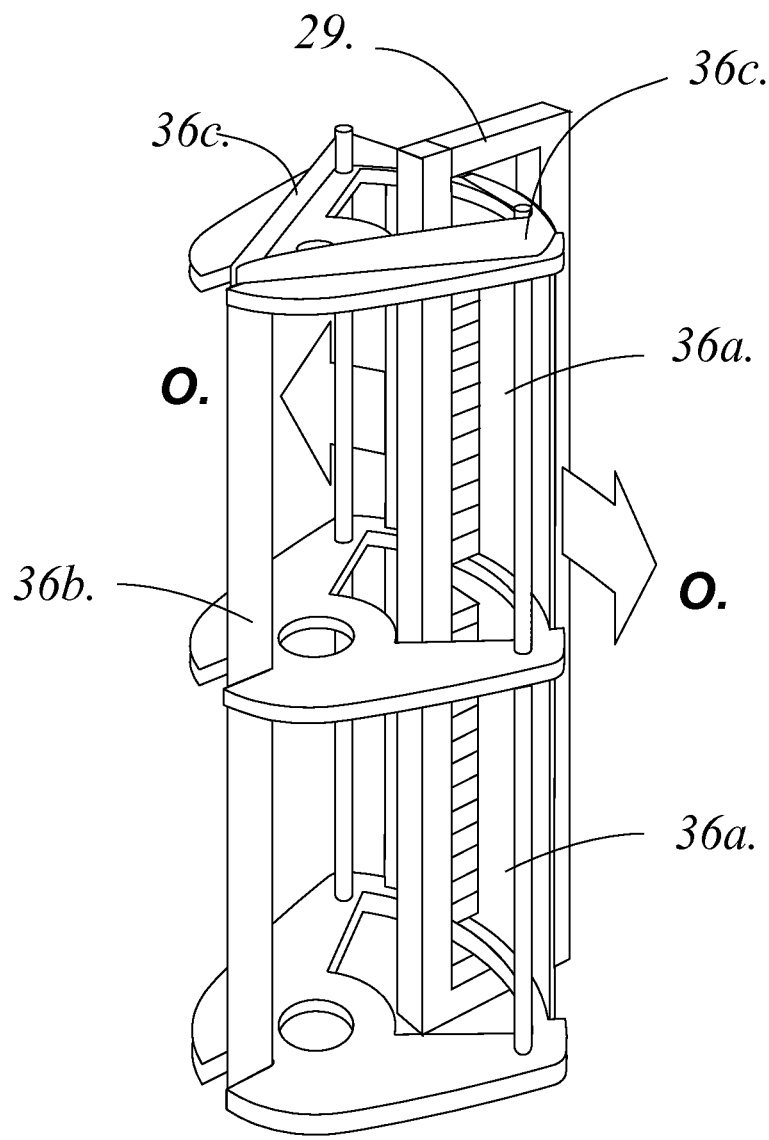

FIG. 29 is a perspective view from forward, port of, and slightly above the preferred embodiment of the skeleton of the $20 Model oscillating wing (7b.) wrapped with the Coil (36.) which shows how when the skeleton of the $20 Model oscillating wing (7b.) oscillates (O.), the Aft side of the coil (36a.) oscillates (O.) through the PMDA (29.).

Figure 30:
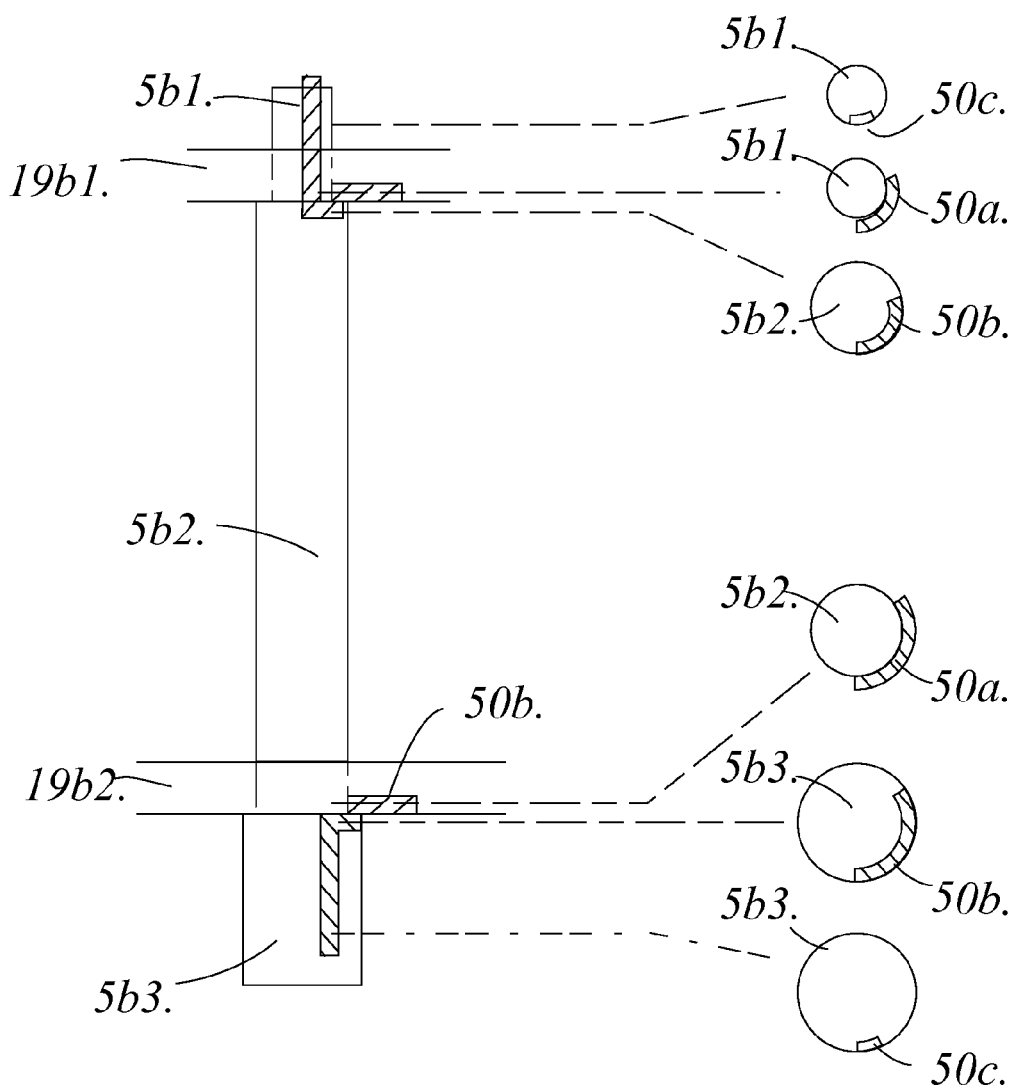

FIG. 30 shows the path of conductive strips between the ends of the Coil (36.) and the outside of the machine.

Figure 31:
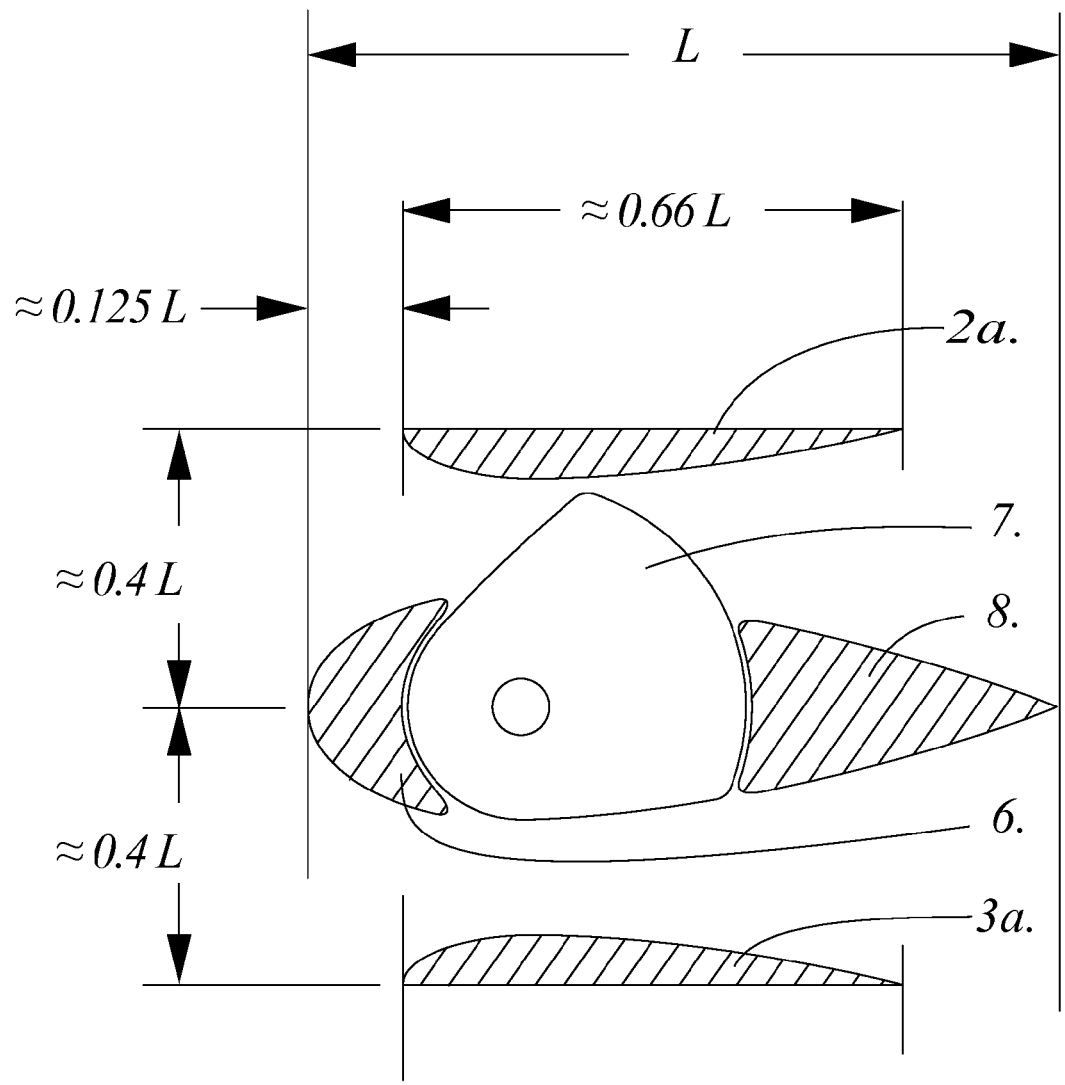

FIG. 31 shows another embodiment of the apparatus wherein, the outside half of either or both the Starboard wall (2.) and or the Port wall (3.) are flat, allowing the apparatus to be placed side by side with another or to be otherwise mounted.

DETAILED DESCRIPTION OF THE INVENTION

The Wind Wing is a simple machine. Yet the manner in which it works and can be constructed, and the advantages it provides appear remarkably sophisticated. So simple in fact, are Wind Wings that they can be constructed by almost any community anywhere in the world using local craftspeople and mostly-locally-available inexpensive materials.

However like all machines, Wind Wings benefit from advanced materials and fabrication techniques, as well as from well-engineered competitively priced components. In addition to allowing them to being more reliable and more resilient to corrosive elements such as rain, salt, dust, sand, sunlight and temperature variations, such materials, techniques and components allow stronger and thus larger Wind Wings, capable of capturing more wind energy and converting it into electrical energy. What they won't do is eliminate the demand to respect the destructive power of strong winds and other environmental hazards such as earthquakes, fires, etc., the demand to minimize potential injuries to humans, animals or property, and the demand to otherwise not harm the environment. So that underlying everything that follows is the assumption that engineers and others developing and building Wind Wings will follow established and local safety, engineering and architectural standards, including thorough testing. But, because Wing Wings are so simple, this should prove relatively easy and inexpensive.

There are two basic models of Wind Wings. These evolved because it was realized that the means by which Wind Wings convert wind energy into mechanical energy could be integrated into a machine capable of being fabricated by almost any community anywhere in the world by local craftspeople using mostly-locally-available inexpensive materials. In fact, it appears that in many communities in the world, a Wind Wing can be fabricated for as little as $20. And that, with sufficient wind, it will supply enough electricity to light up a room or power a small computer or smartphone. Because of this potential, the respective model has been named the $20 Model.

To make possible the $20 Model, a new type of mechanical energy to electrical energy conversion system, or generator, the Wind Wing Electrical Generator was invented. It consists of a combination of a uniquely wrapped coil (FIGS. 24., 25. and 29.), and a unique assembly of permanent magnets named the Permanent magnet dipole assembly, abbreviated PMDA (29.) (FIGS. 15 through 19., 22., 26. through 29.). There is nothing to prevent this system from being used in the other model of the Wind Wing, named the $500 and up Model. In fact it appears that it will likely provide better price performance in converting the Wind Wing's captured mechanical energy into electrical energy than commercially available components capable of the same functionality (FIGS. 13. and 14.). However, in respect to the fact that these components have been under development for over 100 years, the $500 and up Model is here described as using them.

Wind Wings convert wind energy into electrical energy in a four step process. The first step is to rotate its face square to the wind. The second step to convert wind energy into mechanical energy. The third is to convert this mechanical energy into electrical energy. And the fourth is to reset itself to begin repeating the second and third steps. In the event wind direction changes, after the fourth step, the first step is repeated, followed by the second and so on.

The way a Wind Wing rotates its face square to the wind is to pivot so that its stem points away from the wind.

FIG. 1 is a perspective view of a Wind Wing from a point forward of it, to its port side and slightly above it. Visible are the elements that constitute its face: the forward parts of its Floor (1.), Starboard wall (2.), Roof (4.) and Forward nacelle (6.), and the forward openings of its two air channels; one bounded by its Floor (1.), Starboard wall (2.), Roof (4.) and the Forward nacelle (6.), and the other bounded by its Floor (1.), Port wall (3.), Roof (4.) and the Forward nacelle (6.). Also visible is part of the Oscillating wing (7.) and the top of its Shaft (5.). It is around this Shaft (5.) that the Wind Wing pivots when the wind changes direction. The Shaft (5.) is sufficiently forward that pressure on either side will rotate its stem away from the wind.

FIG. 6 shows this pressure as P and the resulting rotation as R. It also shows the preferred embodiment of two rollers, a Starboard roller (10.) and a Port roller (11.) to support the aft part of the Floor (1.) through this rotation, and a Pivot collar (9.) to enclose the base of the Shaft (5.) and to support the forward part of the Floor (1.) as it rotates around it The second step in the manner Wind Wings convert wind energy into electrical energy is the conversion of wind energy into mechanical energy. Wind Wings do this by using energy from the wind to rotate and oscillate its central element, named the Oscillating wing (7.).

FIG. 2 is view down from of the top of a Wind Wing with the Roof (4.) removed which shows the Floor (1.), Starboard wall (2.), Port wall (3.), Shaft (5.), Forward nacelle (6.), Oscillating wing (7.) and Aft nacelle (8.). The hatching of the Starboard wall (2.), Port wall (3.), Forward nacelle (6.), and Aft nacelle (8.) reflect these elements lying flush against the Roof (4.) and connected with in an assembled machine. Protected on all sides by these elements, in the center is the Oscillating wing (7.) and the Shaft (5.).

In the preferred embodiment of the $500 and up Model, the Shaft (numbered 5a to distinguish it as for the $500 and up Model) is attached to the Oscillating wing (7.) and rotates with it. This allows this Shaft (5a.), to carry the mechanical energy that has been captured from wind energy to where it can be converted into electrical energy.

In the preferred embodiment of the $20 Model, the Shaft (numbered 5b to distinguish it as for the $20 Model) is anchored in both the Floor (1.) and the Roof (4.). This allows the Shaft (5b.) to be fabricated from lower quality material, presumably wood, which is all that may be economically available in many of the poorer communities of the world. It also eliminates the demand to rotate the mass of this Shaft (5b.) which, where a relatively thick shaft may be required to compensate for weakness of this lower quality material, could provide a significant degree of unwanted inertia. Finally, a $20 Model shaft (5b.) may be used to hold the Roof (4.) down against the tops of the Starboard wall (2.), Port wall (3.), Forward nacelle (6.), Oscillating wing (7.) and Aft nacelle (8.). To enable this holding down, either a collar around or a key through the top of the Shaft (5b.) can be employed.

The way the Wind Wing converts wind energy into mechanical energy is to use it to rotate the Wind Wing's Oscillating wing (7.). FIG. 7 (a.) and (b.) show the limits of these rotations: FIG. 7 (a.) showing the starboard limit, FIG. 7 (b.) showing the port limit. In a reasonably well constructed Wind Wing, this range of rotation will approximate 60 degrees. With sufficient wind, anything above 5 MPH, the Oscillating wing (7.) will oscillate across this range.

It is worthy of highlight that achieving oscillation, not simply flutter or vibration, but oscillation over a range of approximately 60 degrees using an unarticulated Oscillating wing (7.) is not trivial. Because as any body rotates in one direction, lift in that direction decreases, while in the other direction, it increases. Thus there is a strong tendency for any unarticulated airfoil to remain centered with its chord parallel to the wind. The Wind Wing deals with this problem by creating eddy currents aft of its exposed corner. As the Oscillating wing (7.) rotates more, exposing more of a corner, these eddy currents begin acting on the wind upwind of them eventually destroying their local high speed and local static pressure to the point of catastrophically temporarily destroying this local lift. This allows lift on the other side to dominate until the Oscillating wing (7.) rotating in response, exposes its corner on that side, repeating the phenomena. Unlike turbine blades which rotate in response to the lift they create, the Wind Wing rotates in response to the lift it destroys. This in turn demands that the Wind Wing first create an usual degree of lift on both sides, before destroying it on one side and then the other.

To create this unusual degree of lift the Wind Wing makes extensive use of two classes of airfoils, each close to those developed by the National Advisory Committee of Aeronautics, the NACA (the predecessor Agency to NASA) in the 1920s: an Airfoil close to NACA 0020 (12.) and an Airfoil close to NACA 0040 (13.).

An Airfoil close to NACA 0020 (12) is here defined as a NACA 0020 or another NACA symmetrical airfoil having a thickness 20±3% the length of its chord.

An Airfoil close to NACA 0040 (13) is here defined as a NACA 0040 or another NACA symmetrical airfoil having a thickness 40±3% the length of its chord.

An Airfoil close to NACA 0020 (12.) and an Airfoil close to NACA 0040 (13.) provide a number of advantages. One is that the outlines of NACA 0020 and NACA 0040 both follow a NACA developed formula for its 4-digit airfoils:

$$y_t = \frac{t}{0.2}c\left[0.2969\sqrt{\frac{x}{c}} - 0.1260\left(\frac{x}{c}\right) - 0.3516\left(\frac{x}{c}\right)^2 - 0.2843\left(\frac{x}{c}\right)^3 - 0.1015\left(\frac{x}{c}\right)^4\right]$$

where:
  c is the chord length,
  x is the position along the chord from 0 to c, y is the half thickness at a given value of x (centerline to surface), and t is the maximum thickness as a fraction of the chord NACA 0020 has a thickness 20% of its chord, while NACA 0040 has a thickness 40% of its chord.

Using this formula, which can be found on the Internet, the outlines of virtually any size NACA 0020 and NACA 0040 airfoil can be lofted anywhere in the world by any craftsperson capable of using it to create actual dimensions. Another advantage is that an Airfoil close to NACA 0020 (12.) and an Airfoil close to NACA 0040 (13.) each impart very little drag on air airflows around them, while simultaneously diverting these airflows in a manner that increases their local speeds and decreases their local pressures.

In the preferred embodiments, an Airfoil close to NACA 0020 (12.) is used to form the outlines of the Starboard wall (2.) and the Port wall (3.). Also in the preferred embodiments, an Airfoil close to NACA 0040 (13.) is used to develop the outlines of the Forward nacelle (6.), the Oscillating wing (7.) and the Aft nacelle (8.).

FIG. 8 (a.), (b.) and (c.) shows the method invented to create the outlines of the Forward nacelle (6.), Oscillating wing (7.) and the Aft nacelle (8.) using a Airfoil close to NACA 0040 (13.); dividing it with design circles, slicing it, copying and rotating one of the sliced sections, combining the rotated copy with the original, establishing clearances, and rounding off the side corners.

FIG. 8 (a.) shows two design circles, a Forward design circle (14.) and a Aft design circle (15.). In the preferred embodiment, both are established with their center at the point midway between the widest points on this Airfoil (13.). The diameter of the Forward design circle (14.) is set at the width of this Airfoil (13.) at that point. The radius of the Aft design circle (15.) is set at 40±5% of the distance from the center to the aft most point of this Airfoil (13.). This center point also becomes the axis of the Shaft (5.).

The section of this Airfoil (13.) forward of the Forward design circle (14.) becomes the basis for development of the preferred embodiment of the outline of the Forward nacelle (6.), while the section aft of the Aft design circle (15.) becomes the basis for the development of the preferred embodiment of the outline of the Aft nacelle (8.). The remaining middle section becomes the basis for development of the preferred embodiment of outline of the Oscillating wing (7.). When complete, it will rotate around the Shaft (5.).

FIG. 8 (b.) shows this middle section copied, the copied section rotated around the axis of the Shaft (5.) at an angle 25±5 degrees to the centerline, and both combined. After its corners are rounded to allow the wrapping of the Skin (20.), this combined form becomes the outline of the preferred embodiment of the outline of the Oscillating wing (7.).

FIG. 8 (c.) shows the results of the remaining steps in the determination of the eventual outlines of these preferred embodiments. A Forward air gap (16.) is cut out of the section about to become the preferred embodiment of the outline of the Forward nacelle (6.), between it and the section about to become the preferred embodiment of the outline of the Oscillating wing (7.). Also an Aft air gap (17.) is cut out of the section about to become the preferred embodiment of the outline of the Aft nacelle (8.) between it and the section about to become the preferred embodiment of the outline of Oscillating wing (7.). These air gaps are sufficiently wide to allow the preferred embodiment of the Oscillating wing (7.) to freely rotate, but not significantly wider. Then the corners of the outline of the preferred embodiment of the Forward nacelle (6.) are trimmed so as to allow the wrapping of its Skin (20.) and to have it not to interfere with the preferred embodiment of the Oscillating wing (7.) as it rotates to its port most and starboard most positions. Finally, the forward two corners of the preferred embodiment of the outline of the Aft nacelle (8.) are trimmed so as to allow the wrapping of its Skin (20.).

FIG. 9 shows the method invented to size and position the preferred embodiment of the Starboard wall (2.), the preferred embodiment of the Port wall (3.) and the combination of the preferred embodiments of the Forward nacelle (6.), Oscillating wing (7.) and the Aft nacelle (8.) to achieve the oscillation the Oscillating wing (7.). In addition to what is shown, there will be required slight adjustment to the positions to accommodate different materials that might be used for the Skins (20.) of each element so that within a few seconds of the Wind Wing rotating to face the wind, the Oscillating wing (7.) will begin to oscillate. An outline of the Floor (1.) and the Roof (4.) can then be lofted as shown in FIG. 2.

The preferred embodiments for construction of the Starboard wall (2.), Port wall (3.), Forward nacelle (6.), Oscillating wing (7.) and Aft nacelle (8.) for both the 20 Model and the $500 and up Model use the monocoque technique, first introduced in French WWI airplanes, and used by the airplane construction industry ever since. Monocoque construction involves using frames and struts to form skeletons around which is wrapped a skin. It is remarkably strong, light and can utilize a broad range of materials.

In other preferred embodiments for construction of the Starboard wall (2.), Port wall (3.), Forward nacelle (6.), Oscillating wing (7.) and Aft nacelle (8.) for both the 20 Model and the $500 and up Model the skeletons and the Skins (20,) are replaced wholly or in part with molded forms.

The preferred embodiments for construction of the Floor (1.) and the Roof (2.) are simply that they provide structural support to the Starboard wall (2.), Port wall (3.), Shaft (5.) Forward nacelle (6.), and Aft nacelle (8.), that they support the entire structure by resting on the Pivot collar (9.) and the Port roller (10.) and Starboard roller (11.), that they be sufficiently light to allow the Wind Wing to rotate to face the wind (FIG. 6.), and that they do not significantly adversely affect the wind passing into or around it.

The preferred embodiments of the Starboard wall (2.), Port wall (3.), Forward nacelle (6.), Oscillating wing (7.) and Aft nacelle (8.) for both the 20 Model and the $500 and up Model include a means of attaching them to the Floor (1.) and the Roof (4.).

In the preferred embodiments, the height of any Wind Wing, and thus the heights of the (1.), Starboard wall (2.), Port wall (3.) Forward nacelle (6.), and Aft nacelle (8.) above all, need to respect established and local safety, engineering and architectural standards. They should then be determined by the materials and the fabrication capabilities economically available, being no higher than will reliably stand up against local winds, being no heavier than will allow the Wind Wing to rotate to keep its face to the wind, and with its Oscillating wing (7.) being able to achieve and sustain the oscillations just described. Outside of this, the higher the Wind Wing, and the higher its Oscillating wing (7.), the more wind energy it will be able to capture and convert into electrical energy. And that esthetics aside, it only makes sense to build them as high as practical.

In this direction, the simplicity of the vertical expandability of the Starboard wall (2.), Port wall (3.), Shaft (5.), Forward nacelle (6.), Oscillating wing (7.) and Aft nacelle (8.) offer a significant advantages over other machines that convert wind energy into electrical energy. Unlike turbines, where a broad range of factors can demand reengineering most of the machine in order to increase its capacity, most Wind Wings should be able to tolerate limited increases in height and thus wind capturing and energy conversion capability, by simply increasing the heights of the Starboard wall (2.), Port wall (3.), Shaft (5.), Forward nacelle (6.), Oscillating wing (7.) and Aft nacelle (8.). It is thus particularly amenable to local heuristic improvements to better cope with and take advantage of local environment peculiarities.

FIG. 10 is a perspective view, and FIG. 11 (*a*.), (*b*.) and (*c*.) are top, side and front views respectively of the monocoque constructed skeleton of the $500 and up Model oscillating wing (7*a*.) which shows $500 and up Model frames (19*a*.), Struts (18.) and the $500 and up Model shaft (5*a*). In the preferred embodiment, there should be as many $500 Model intermediate frames (19*a*2.) and Struts (18.), as necessary to support the Skin (20.) creating the determined outline of Oscillating wing (7.), but no more. FIG. 12 is perspective view of the preferred embodiment of the Skin (20) applied to the frames of the $500 and up Model oscillating wing (7*a*.). It also shows its attached $500 and up Model shaft (5*a*.).

The preferred embodiment of $500 and up Model oscillating wing (7*a*.) differs from the preferred embodiment of the $20 Model oscillating wing (7*b*.) principally in three respects.

The first is that in the preferred embodiment of the $500 and up Model, the $500 and up Model frames (19*a*.) are attached to the $500 and up Model shaft (5*a*.); whereas in the preferred embodiment of the $20 Model, the $20 Model frames (19*b*.) rotate around the $20 Model shaft (5*b*.). In the preferred embodiment of the $500 and up Model, the $500 and up Model shaft (5*a*.) allows the transfer of mechanical energy from the oscillations of the $500 and up Model oscillating wing (7*a*.) through the $500 and up Model shaft (5*a*.) to any one of numerous established arrangements for converting oscillating mechanical energy into electrical energy. In contrast in the preferred embodiment, of the $20 Model, the $20 Model frames (19*b*.) rotate around the $20 Model shaft (5*b*) allowing communities around the world building their own $20 Models to use lower quality material to be used for the Shaft (5.).

FIGS. 13 and 14 are respectively perspective and side views of one arrangement whereby a Wind Wing could converts oscillating mechanical energy into electrical energy. There are no patent claims regarding it and these drawings are included solely to facilitate understanding of how the mechanical energy of the oscillations of the $500 and up Model oscillating wing (7*b*.) might be transmitted to a standard (electrical) generator (25.). Configurations of equipment to convert oscillating mechanical energy into electrical energy have been under development since sometime in the early 1800 s when someone first decided to connect a steam driven piston engine to an electrical generator. Builders of $500 and up Models can choose whatever configurations make the best sense for them and their customers.

Being able to use lower quality materials for the $20 Model shaft (5*b*.) will provide a significant advantage to many communities building $20 Models for their own use. Good wood, the most obvious material that might be used for a $20 Model shaft (5*b*) can be a scarce and expensive commodity in many parts of the world, particularly in a number of Asian and South American mountainous areas where wind is abundant. Letting the $20 Model frames (19*b*.) rotate around the $20 Model shaft (5*b*.) means that lower quality wood or other materials can be used instead. Compensation for lack of strength in economically available wood can be provided by using larger diameters for $20 Model shafts (5*b*.).

The second way in which the preferred embodiment of the $500 and up Model oscillating wing (7*a*.) differs from the preferred embodiment of the $20 Model oscillating wing (7*b*.) is in accommodating a uniquely wrapped Coil (36.) and in providing clearance for the Permanent dipole magnet assembly, hereafter the PMDA (29.).

FIG. 15 (*a*.), (*b*.) and (*c*.) are respectively top, port side and front views of the PMDA (29.). The preferred embodiment of the PMDA (29.) is comprised of two or more arrays of magnets, all with their poles aligned in the same direction fore or aft, a Forward magnet array (34.) which consists of Upper forward magnet array (34*a*.), and any number combinations of Frame clearance spacers (34*b*.) and Lower forward magnet arrays (34 *c*.), and an Aft magnet array (35.). All are held in place by two slotted and bent iron bars, a Forward magnet array holder (30*a*.) and an Aft magnet array holder (30*b*.). These bars are themselves pulled against one another by the attraction of the magnet arrays (34. and 35.). In addition, the preferred embodiment of the PMDA (29.) may include two backing plates, the Forward backing plate (33*a*.) and the Aft backing plate (33*b*.).

FIGS. 16, 17 and 18 are respectively top, port side and front views of the components of the preferred embodiment of the PMDA (29.). The taper of the Individual permanent magnets (32.) allows them to be inserted partly in the Compound magnet slots (31.) but not pass completely through as would otherwise occur due to the attraction of the opposing arrays (either 34. or 35.).

The PMDA (29.) is a simple but very capable component. By allowing Individual permanent magnets (32.) to be stacked in arrays (34. and 35.) with all their poles aligned in the same direction fore or aft, and with some insulation between them, these arrays become compound magnets, each behaving like a single magnet. Compound magnets are arrangements that discovered around 1830 and later abandoned around the turn of the century in favor of other forms of developing strong magnets. But they are a way that poorer communities can fabricate strong arrays from smaller Individual permanent magnets (32.).

Larger single magnets or magnets of lesser than large single size can in all cases be substituted for magnet arrays. In the latter event they would function as arrays with the same functionality, advantages, and demands for Backing plates (33.).

Fabrication of Individual permanent magnets (32.) is beyond the scope of this description. But it is something that can be performed in almost any community anywhere in the world with just a strong permanent magnet or a DC source of electricity such as a car battery. The preferred embodiment of each Individual permanent magnet (32,) has a taper as shown in FIG. 17 which allows it to be inserted in the Compound magnet slot of the Forward magnet array holder (30*a*.) and the Aft magnet array holder (31*b*.).

In the preferred embodiment of the PMDA, Backing plates (33.) keep the Individual permanent magnets (32.) which, with poles all aligned in the same direction and thus repelling one another, from forcing themselves out of the Forward magnet array holder (30*a*.) and the Aft magnet array holder (30*b*.). They can be secured to the rest of the PMDA by something as simple as twine, which, when the Individual permanent magnets (33.) need to be replaced, can simply be untied.

In the preferred embodiment of the PMDA, the Forward magnet array holder (30*a*.), the Individual magnets (32.) it has assembled into the Forward magnet array (34.) and the Forward backing plate (33*a*.), all assembled as a unit, will be strongly attracted to the Aft magnet array holder (30*b*.), the Individual magnets (33.) it has assembled into the Aft magnet array (35.) and the Aft backing plate (33*b*) all assembled as a unit, by the attraction between the Forward magnet array (34.)

and the Aft magnet array (35.). So much so that in the preferred embodiment of the PMDA, no other connective effort need be expended to hold the PMDA (29.) together. Indeed, none should be expended as this allows the PMDA (29.) to be relatively easily assembled, and then as the Individual magnets (32.) lose strength to where they need replacement or remagnitization, it can be relatively easily disassembled.

Because the horizontal sections of the Forward magnet array holder (30a.) and the Aft magnet array holder (30b.) can each be hammered to reduce their lengths by hammer blow amounts, the PMDA (29.) architecture allows the aft side of the Forward magnet array (34.) to be positioned at a very precise distance and parallel to the forward side of the Aft magnet array (36.). This, in turn means the gap between them can be narrowed to no more than is absolutely necessary to allow the Aft side of the coil (36a.) to oscillate back and forth through it.

It is worth highlighting that the precision with which the width of this gap can be controlled, simply by hammering the horizontal sections of the Forward magnet array holder (30a.) and the Aft magnet array holder (30b.) can equal what can be achieved by machine tooling. The nature of the PMDA architecture (29.) allows this capability within it to almost any community anywhere in the world.

FIG. 19 shows how, in the preferred embodiment, the Aft side of the Coil (36a.) oscillates (O.) through this gap. Following Faraday's Law, which says the motion of a wire through a magnetic field in a direction perpendicular to the field will induce a voltage in that wire, this motion induces a voltage in the Coil (36.)

Faraday's Law goes on to say that the magnitude of voltage induced depends upon three factors: the length of the wire moving perpendicular to and through the magnetic field, the speed with which it moves in this direction, and the strength of the field. By allowing no more than necessary a gap between the aft side of the Forward magnet array (34.) and the forward side of the Aft magnet array (36.) the PMDA (29.) maximizes the strength of the magnetic field in this gap that can be achieved by the Forward magnet array (34.) and the Aft magnet array (36.), and in this respect maximizes the voltage that is induced in the Coil (36.).

Another way in which the PMDA (29.) allows the creation of an strong magnetic field is by simply providing magnets on both sides of the Aft side of the coil (37a.). Almost all other mechanical energy to electrical energy conversion systems (i.e. electric generators) are limited to having magnets on only one side of the affected sections of their coils. Having magnets, or in this case magnet arrays on both sides, provides the benefit of approximately doubling the strength of the magnetic field, which is in addition to the benefit, just discussed, of having the poles as close as practical.

How the PMDA (29.) allows magnets on both sides the Aft side of the coil (36a.) when practically no other mechanical energy to electrical energy conversion systems (i.e. electrical generators) do, lies in the ability of the Forward magnet array holder (30a.) and an Aft magnet array holder (30b.) to provide the lowest resistance path for flux between the outside poles of the magnet arrays (this is to say between the forward poles of the magnets the Forward magnet array (34.) and the aft poles of the Aft magnet array (36.)) over and under the Aft side of the coil (36a.).

Magnetic flux invariably follows the path of least resistance. Without the iron Forward magnet array holder (30a.) and Aft magnet array holder (30b.) providing paths of lower resistance over and under the Aft side of the coil (36a.) the path of flux between the outside poles (the forward pole(s) of the Forward magnet array (34.) and the aft poles of the Aft magnet array (36.) would pass through the air and through the Aft of side of the coil (36a), offsetting the flux passing between the poles nearest to one another (the aft pole(s) of the Forward magnet array (34.) and the forward pole of the Aft magnet array (36.)).

Using a PMDA (29.) requires a Coil (36.), specially wrapped around the $20 Model Oscillating wing (7b.), itself providing both PMDA clearance (30.) so that the Forward magnet array (34.) is able to fit inside of it, along with notches fore and aft (38. and 39.) and strut extensions so that the Coil (36.) can be wrapped in this special manner In the preferred embodiment of the $20 Model Oscillating wing (7b.), Shaft clearance holes (40.) are cut from the $20 Model frames (19b.) allowing them to fit over, rest on, and rotate around the $20 Model shaft (5b.). FIG. 20 (a.) and (b.) are top and side views which show the preferred embodiment of the $20 Model shaft (5b.) to have three distinct diameters: one for the $20 Model shaft-top (5b1.) one for the $20 Model shaft-middle (5b1.) and one for the $20 Model shaft-bottom (5b1.).

In the preferred embodiment, the $20 Model bottom frame (19b3.) is large enough so that in can slide over and rotate around the $20 Model shaft-middle (5b2.) but small enough that it can rest on the $20 Model shaft-bottom (5b3.). The $20 Model intermediate frame (s) (19b2.) is or are large enough that it or they can slide over and rotate freely around the $20 Model shaft-middle (5b2.), but no larger. The $20 Model top frame (19b1.) is large enough so that it can slide over the $20 Model shaft-top (5b1.) and rotate around it, but small enough to rest on the $20 Model shaft-middle (5b2.).

FIG. 21 shows how the $20 Model top frame (19b1.) is supported by the $20 Model shaft-middle (5b2.) and the $20 Model shaft-bottom (5b1.) is supported by the and $20 Model bottom frame (19b3.).

Along with FIG. 22, it also shows the location of the Struts (18.). Holes are cut in each of the $20 Model frames (19b.) for the Struts (18.) The Struts (18.) themselves extend over the $20 Model top frame (19b1.) and under the $20 Model bottom frame (19b3.) in order to allow the Coil (37.) to be wrapped around them (FIG. 24).

Depending upon size of the $20 Model Oscillating wing (7b.) the available materials, and environment it will be operating in there may be a need for additional $20 Model intermediate frame (19b2.) and additional Struts (18.). In this case holes must be cut in these additional $20 Model intermediate frames (19b2.) for both the Shaft (5.) and these additional Struts, although they themselves should not extend over the $20 Model top frame (19b1.) or under the $20 Model bottom frame (19b3.)

Also cut out of each $20 Model oscillating wing frame (19b.) is PDMA clearance (30.). Its outline is determined as shown in FIG. 22 (a.) and (b.) by rotating the outline of the Oscillating wing (7.) to the angle of its maximum practical rotation (MPR in FIG. 24) in each direction and assuring there is adequate clearance for the combination of the Forward magnet array holder (30a.), the Individual magnets (32.) it has assembled into the Forward magnet array (34.) and the Forward backing plate (33a.), all assembled as a unit, to be inserted into the Oscillating wing (7b.), rotated into position, and inserted into the Floor PMDA notch (41b.) and then not be interfered with as the $20 Model Oscillating wing (7b.) oscillates.

A Forward coil notch (38.) guides the wrapping of the Forward side of the Coil (36b.) over the $20 Model frames (19b.) as closely as practical to the Shaft (5.) so as to minimize its rotational inertia. An Aft coil notch ((39.) guides the wrapping of the Aft side of the Coil (36a.) over the $20 Model frames (19b.) across the Aft coil arc (39b.) at the Aft control depth (39a.) both of which allow the Aft side of the Coil (36a.) to oscillate freely between the aft pole(s) of the Forward magnet array (34.) and the forward pole of the Aft magnet array (36). The Aft coil arc (39b.) is cut across an arc that is targeted slightly greater than twice the angle of the MPR, but not so far as to not allow room for the wrapping of the Skin (20.) around the corners of the $20 Model oscillating wing.

FIG. 23 is a perspective view of the preferred embodiment of the wrapping of the Skin (20.) around the $20 Model frames (19b.) assembled to include the Struts (18.) seen from a point aft of it, to its port side and slightly above it. This wrapping, and attaching of the Skin (20.) to the $20 Model frames (19b.) needs to occur after the Coil (36,) has been itself wrapped around the assembled $20 Model frames (19b.) and Struts (18.). When wrapped, and if sufficiently rigid, the Skin (20.) should extend slightly above the $20 Model top frame (19b1.) and slightly below the $20 Model bottom frame (19b3.) to afford a respective degree of protection to the areas within these extensions.

FIG. 24 is a perspective view of the preferred embodiment of the Coil (36.) wrapped around the $20 Model frames (19b.) seen from a point forward of them, to their port side and slightly above them. FIG. 25 (a.), (b.), and (c.) are respectively top. bottom, and port side views of the preferred embodiment of the Coil (36.) which show the directions (D) it needs to be wrapped so as clear the PMDA (29), but still have the wires of the Aft side of the Coil (36a.) oscillate through and perpendicular to the magnet field between the aft pole (s) of the Forward magnet array (34.) and the forward pole of the Aft magnet array (36).

In the preferred embodiment, the Coil (36.) is wrapped upward through the Forward coil notches (38.) until it reaches the top of the $20 Model top wing frame (19b1.). From there its wrapped aft around one of the protruding Struts (18.) either port or starboard to the Aft coil notch (39.), where it curves around a previous wrap if there is one, and directed downward to the same horizontal position of Aft coil notch (39.) of the $20 Model bottom wing frame (19b3.). At this point it is again curved around a previous wrap to one of the one of the protruding Struts (18.) extending downward the bottom of the $20 Model bottom wing frame (19b3.) Finally it is directed forward to the Forward coil notch (38.). This time after it reaches the top, it is directed aft on the other side. If the first pass was on the port side, the second should be on the starboard side or visa versa. The same is true when going down the aft side it reaches the bottom. There, the same routine as used at the top, alternating one side and then the other should be followed.

Key here is to keep wrap going in the same direction down the Aft side of the Coil (36a.). For purposes of inducing a current in it following Faraday's Law, each strand as moves through magnetic field between the aft pole(s) of the Forward magnet array (34.) and the forward pole of the Aft magnet array (36.) of the PMDA (29.) is treated like an additional length of the same wire, which indeed it is.

FIGS. 26 (a.) and (b.) are respectively port side and front views that show how the preferred embodiment of the PMDA (29.) is positioned midway between the sides in a Floor PMDA notch (41b.) and in a Roof PMDA notch (41c.), and fore and aft such that the Forward magnet array (34.) is inside the $20 Model oscillating wing (7b.) while the Aft magnet array (35.) is outside of it.

FIG. 26 (a.) also shows the use of a Frame clearance spacer (34b.) between the Upper forward magnet array (34a.) and the Lower forward magnet array (34b.) to provide clearance for a $20 Model intermediate frame (19b2.). This configuration, a Frame clearance spacer (34b.) above a Lower forward magnet array (34b.) providing clearance for a $20 Model intermediate frame (19b2.) can be repeated under the Lower forward magnet array (34b.) as many times as necessary to allow for any number of $20 Model intermediate frames (19b2.) to shape the Skins (20.) of $20 Model oscillating wings (7b.) of any reasonable height.

The height of the Oscillating wing (7b.) and the material chosen for the Skin (20.) determine the number of $20 Model intermediate frames (19b2.) if any, that are required. Shorter Oscillating wings (7b.) and those which use materials which are relatively rigid, such as metal or cardboard for its Skin (20.), or which are coated with protective substance such as fiberglass, that also stiffens may not require more than one $20 Model intermediate frame (19b2.), and in some instances not even one. Higher Oscillating wings (7.) or those which use materials which are easily bent or crushed, such as paper or animal skins, may however, require a number of $20 Model intermediate frames (19b2) to maintain the aerodynamic outline of Oscillating wing (7b.). If so, they need to be included.

FIG. 27 is a perspective view from forward, port side and slightly above that shows the preferred embodiment of the PMDA (29.) fitting into the Aft nacelle PMDA notch (41a.) in the Aft nacelle (8.) aft of it and the Floor PMDA notch (41b.) in the Floor (1.) underneath it.

FIG. 28 is a top view of the of the $20 Model with the Roof (4.) removed which again shows the preferred embodiment of the PMDA (29.) fitting into PMDA notch (41a.) in the Aft nacelle (8.). It also shows that in the preferred embodiment, the Aft nacelle PMDA notch (41a.) to be sufficiently deep that when the PMDA (29.) is fitted into the Floor PMDA notch (41b.), the forward face of the Aft nacelle (8.) will be flush with the forward face of the Aft magnet array (35.). And that between the aft pole(s) of the Forward magnet array (34.) and the forward pole of the Aft magnet array (35.) of the PMDA (29.), the Aft side of the coil is free to rotate and oscillate along with the $20 Model oscillating wing (7b.).

These notches (41a. and 41b.) facilitate assembly of the preferred embodiment of the $20 Model; and with the Roof PMDA notch (41c.) fitting over the PDMA (29.) as the Roof (4.) is lowered to attach to the Starboard wall (2.), Port wall (3.), Shaft (5.), Forward nacelle (6.) and Aft nacelle (8.), provide an additional degree of stability to the entire structure. More importantly they allow for the remarkably close fit of the Aft side of the Coil (36a.) rotating through the gap between the aft pole(s) of the Forward magnet array (34.) and the forward pole of the Aft magnet array (35.).

FIG. 29 provides the same view as FIG. 21, but, whereas FIG. 21 shows only the Aft part of the coil (36a.) oscillating (O.) through four of elements of the PDMA (29.), FIG. (31.) shows also the Top part (36c.) and Forward part of the coil (36b.) as wrapped around the $20 Model frames (19b.). What this view enables is how oscillation (O.) of the $20 Model frames (19b.) oscillates (O.) the Aft part of the coil (36a.) through the PMDA (29.) thus inducing a voltage in the Coil (36.). It is this voltage, when connected to a load outside the machine, that allows the Wind Wing to convert the mechanical energy of the $20 Model Oscillating wing (7b.) into electrical energy.

In the preferred embodiment of the $20 Model, transfer of electrical energy from the Coil (36.) to outside of the machines is along two paths. These are shown in FIG. 30. The first path is from one end of the Coil (36.) to a Bushing (50a.) under $20 Model top wing frame (19b1 a.). This rotates over another Bushing (50b.) on the top of the $20 Model shaft-middle (5b2,). From there it travels up a conductive strip on the outside of the $20 Model shaft-top (5131.) to outside the machine. The second path is from the other end of the Coil (36.) to a Bushing (50*a*.) under the $20 Model bottom wing frame (19*b*2.). This rotates over another Bushing (50*b*.) on the top of the $20 Model shaft-bottom (5*b*3.). From there it travels down a conductive strip on the outside of the $20 Model shaft-bottom (5B3.) to outside the machine. In poorer communities of the world, these bushings and conductive strips can be fabricated from aluminum foil.

With the wrapping of the Coil (36.) and connection of its ends to the Bushings (50*b*.) on the undersides of the $20 Model top wing frame (19*b*1*a*.) and the $20 Model bottom wing frame (19*b*2.), the $Model oscillating wing can have its Skin (20.) applied. In most situations, this should involve nothing more than wrapping the Skin (20.) around the $20 Model and gluing it to the $20 Model wing frames. When these are dry, the $20 Model is ready to be assembled.

In other embodiments, of the apparatus, the outside half of either the Starboard wall (2.) and or the Port wall (3.) are flat, allowing the apparatus to be placed side by side with another or to be otherwise mounted.

The invention claimed is:

1. An apparatus for converting oscillating rotational mechanical energy into electrical energy comprising:

- two same-sized L-shaped iron bars with slots for magnets in their longer sides, and with the ends of their shorter sides flattened so that when one is rotated 180 degrees, the shorter ends of each will fit flush against the longer sides of the other, forming a rectangle,
- magnets that will fit into, but not through these slots with the poles of these magnets aligned in the same direction along a line passing through them, creating a strong magnetic field between those fitting into the slots of one of the L-shaped iron bar and those fitting into the slots of the other iron bar pulling one L-shaped iron bar against the other and, creating a permanent magnet dipole,
- two L-shaped iron bars which can be placed over the magnets in their slots, and tied to the L-shaped iron bars containing the slots,
- a coil wrapped such that one side of it will fit through, and be able to rotate in an oscillating manner through the gap between the magnet(s) in the slots of one of the L-shaped iron bars and the magnet(s) in the slots of the other
- access to mechanical forces which rotate this coil in a oscillating manner through this gap,
- leads which will conduct voltage induced in the coil by this action to outside the apparatus.

* * * * *